(12) United States Patent
Wang et al.

(10) Patent No.: US 7,679,787 B2
(45) Date of Patent: Mar. 16, 2010

(54) N-COLOR PRINTING WITH HEXAGONAL ROSETTES

(75) Inventors: Shen-Ge Wang, Fairport, NY (US); Robert P Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 722 days.

(21) Appl. No.: 11/565,470

(22) Filed: Nov. 30, 2006

(65) Prior Publication Data

US 2008/0130054 A1 Jun. 5, 2008

(51) Int. Cl.
*G06K 15/00* (2006.01)

(52) U.S. Cl. .................. 358/3.06; 358/1.9; 358/533; 358/536

(58) Field of Classification Search .................. 358/1.1, 358/1.9, 3.04, 3.06, 3.09, 3.1, 533, 534, 536
See application file for complete search history.

(56) References Cited

U.S. PATENT DOCUMENTS

| | | | | |
|---|---|---|---|---|
| 5,155,599 A | * | 10/1992 | Delabastita | 358/3.07 |
| 5,323,245 A | | 6/1994 | Rylander | |
| 5,371,612 A | * | 12/1994 | Sakamoto | 358/3.2 |
| 5,583,660 A | * | 12/1996 | Rylander | 358/3.17 |
| 5,870,530 A | | 2/1999 | Balasubramanian | |
| 5,892,891 A | | 4/1999 | Dalal et al. | |
| 6,798,539 B1 | * | 9/2004 | Wang et al. | 358/1.9 |
| 6,972,871 B2 | * | 12/2005 | Tsuda et al. | 358/1.9 |
| 6,985,256 B2 | * | 1/2006 | Cheng et al. | 358/1.9 |
| 7,480,076 B2 | * | 1/2009 | Wang | 358/1.9 |
| 2003/0035145 A1 | * | 2/2003 | Wang | 358/3.06 |
| 2004/0109184 A1 | | 6/2004 | Ishii | |
| 2004/0239967 A1 | * | 12/2004 | Wen | 358/1.9 |
| 2006/0066910 A1 | * | 3/2006 | Yasutomi | 358/3.13 |
| 2006/0170975 A1 | | 8/2006 | Wang | |

OTHER PUBLICATIONS

Wang et al., U.S. Appl. No. 11/565,455, entitled "Rosette Printing With Up to Five Colors".
Wang et al., U.S. Appl. No. 11/565,434, entitled "Moiré-Free Color Halftone Configuration Employing Common Frequency Vectors".
T. M. Holladay, "*An Optimum Algorithm for Halftone Generation for Displays and Hard Copies*", Proc. Soc. for Information Display, 21, p. 185 (1980).
J. A. G. Yule, "*Principles of Color Reproduction*", John Wiley & Sons. N. Y. 1967.

* cited by examiner

*Primary Examiner*—Thomas D Lee
(74) *Attorney, Agent, or Firm*—Philip E. Blair; Fleit, Gibbons, Gutmar, Bingini & Bianco P.L.

(57) ABSTRACT

What is provided herein are systems and methods for digitally reproducing a moiré-free color halftone image using an enhanced halftone screen set consisting of a halftone screen for each of N colorants, where N>4. Also disclosed is an enhanced color halftoning screening apparatus for reproducing a moiré-free color halftone image using an enhanced halftone screen set consisting of a halftone screen for each of N colorants, N>4. Further disclosed are embodiments for generating a plurality of non-orthogonal halftone screen outputs for moiré-free enhanced color halftoning.

25 Claims, 25 Drawing Sheets
(21 of 25 Drawing Sheet(s) Filed in Color)

N-COLOR PRINTING WITH HEXAGONAL ROSETTES

CROSS-REFERENCE TO COPENDING APPLICATIONS

Attention is directed to the following commonly assigned and co-pending patent applications filed concurrently herewith: U.S. Publication No. 2008/0130056, entitled: "Rosette Printing With Up To Five Colors"; and U.S. Publication No. 2008/0130055, entitled: "Moiré-Free Color Halftone Configuration Employing Common Frequency Vectors" the disclosure found in these co-pending applications are hereby incorporated by reference in its entirety. The appropriate components and processes of the above co-pending applications may be selected for the teaching and support of the present application in embodiments thereof.

CROSS REFERENCE TO RELATED APPLICATIONS

Cross reference is made to the following patents and publications, the disclosures of each of which are totally incorporated by reference herein: U.S. Pat. No. 7,480,076, to Wang, entitled: "Moiré-Free Color Halftone Configuration"; and U.S. Publication No. 2004/0109184, entitled: "Image Forming Apparatus And Method Thereof", to Ishii. The appropriate components and processes of the above cross referenced patents and applications may be selected for the teaching and support of the present application in embodiments thereof.

TECHNOLOGY

The teachings herein are directed to a method and apparatus for moiré-free halftoning color documents using a combination of an arbitrary number of clustered-dots screens in an enhanced halftone configuration for enhanced printing applications.

BACKGROUND

With the advent of inexpensive digital color printers, methods and systems of color digital halftoning have become increasingly important in the reproduction of printed or displayed images possessing continuous color tones. It is well understood that most digital color printers operate in a binary mode, i.e., for each color separation, a corresponding color spot is either printed or not printed at a specified location or pixel. Digital halftoning controls the printing of color spots, where the spatial averaging of the printed color spots by either a human visual system or a viewing instrument, provides the illusion of the required continuous color tones.

The most common halftone technique is screening, which compares the required continuous color tone level of each pixel for each color separation with one or more predetermined threshold levels. The predetermined threshold levels are typically defined for a rectangular cell that is tiled to fill the plane of an image, thereby forming a halftone screen of threshold values. At a given pixel if the required color tone level is darker than the threshold halftone level, a color spot is printed at that specified pixel. Otherwise the color spot is not printed. The output of the screening process is a binary pattern of multiple small "dots", which are regularly spaced as is determined by the size, shape, and tiling of the halftone cell. In other words, the screening output, as a two-dimensionally repeated pattern, possesses two fundamental spatial frequencies, which are completely defined by the geometry of the halftone screen.

It is understood in the art that the distribution of printed pixels depends on the design of the halftone screen. For clustered-dot halftone screens, all printed pixels formed using a single halftone cell typically group into one or more clusters. If a halftone cell only generates a single cluster, it is referred to as a single-dot halftone or single-dot halftone screen. Alternatively, halftone screens may be dual-dot, tri-dot, quad-dot, or the like.

While halftoning is often described in terms of halftone dots, it should be appreciated that idealized halftone dots can possess a variety of shapes that include rectangles, squares, lines, circles, ellipses, "plus signs", X-shapes, pinwheels, and pincushions, and actual printed dots can possess distortions and fragmentation of those idealized shapes introduced by digitization and the physical printing process. Various digital halftone screens having different shapes and angles are described in: "*An Optimum Algorithm for Halftone Generation for Displays and Hard Copies*", by T. M. Holladay, Proceedings of the Society for Information Display (Proc. SID), Vol. 21, No. 2, pp. 185 (1980).

A common problem that arises in digital color halftoning is the manifestation of moiré patterns. Moiré patterns are undesirable interference patterns that occur when two or more color halftone separations are printed over each other. Since color mixing during the printing process is a non-linear process, frequency components other than the fundamental frequencies and harmonics of the individual color halftone separations can occur in the final printout. For example, if an identical halftone screen is used for two color separations, theoretically, there should be no moiré patterns. However, any slight misalignment between the two color halftone separations occurring from an angular difference and/or a scalar difference will result in two slightly different fundamental frequency vectors. Due to nonlinear color mixing the difference in frequency vectors produces a beat frequency which will be visibly evident as a very pronounced moiré interference pattern in the output. To avoid, for example, two-color moiré patterns due to misalignment, or for other reasons, different halftone screens are commonly used for different color separations, where the fundamental frequency vectors of the different halftone screens are separated by relatively large angles. Therefore, the frequency difference between any two fundamental frequencies of the different screens will be large enough so that no visibly objectionable moiré patterns are produced.

In selecting different halftone screens, for example for three color separations, it is desirable to avoid any two-color moiré as well as any three-color moiré. It is well known that in the traditional printing industry that three halftone screens, which can be constructed by halftone cells that are square in shape and identical, can be placed at 15°, 45°, and 75°, respectively, from a point and axis of origin, to provide the classical three-color moiré-free solution. This is described in "*Principles of Color Reproduction*", by J. A. G. Yule, John Wiley & Sons. N.Y. (1967).

However, for digital halftoning, the freedom to rotate a halftone screen is limited by the raster structure, which defines the position of each pixel. Since tan(15°) and tan(75°) are irrational numbers, rotating a halftone screen to 15° or 75° cannot be exactly implemented in digital halftoning. To this end, some methods have been proposed to provide approximate instead of exact moiré-free solutions. For example, in U.S. Pat. No. 5,323,245, entitled: "Perpendicular, Unequal Frequency Non-Conventional Screen Patterns For Electronic Halftone Generation", and in U.S. Pat. No. 5,583,660, entitled: "Non-Perpendicular, Equal Frequency Non-Conventional Screen Patterns For Electronic Halftone Generation", this problem is approached by using a combination of two or more perpendicular, unequal frequency screen patterns and non-perpendicular, equal frequency non-conventional screen patterns. However, all these approximate solutions result in some halftone dots having centers that do not lie directly on addressable points, or on the pixel positions defined by the raster structure. Therefore, the shape and center location varies from one halftone dot to another. Consequently, additional interference or moiré between the screen frequencies and the raster frequency can occur. In another approach, U.S. Pat. No. 5,371,612, entitled: "Method Of And Apparatus For Forming Halftone Images" discloses a moiré prevention method to determine screen angles and sizes that is usable solely for square-shaped, halftone screens.

U.S. Pat. No. 6,798,539, entitled: "Method For Moiré-Free Color Halftoning Using Non-Orthogonal Cluster Screens" to Wang et al., discloses methods for using single-cell, non-orthogonal clustered-dot screens to satisfy the moiré-free conditions for color halftoning. The disclosure also provides methods that combine single-cell non-orthogonal clustered-dot screens and line screens for moiré-free color halftoning. Particularly, the selection of these single-cell halftone screens is determined by satisfying moiré-free conditions provided in the respective spatial or frequency equations.

The difficulty in avoiding moiré between halftone screens is further exacerbated by the common practice of printing four colors. Four-color printing typically employs halftoning methods for the yellow image separation that produce less than optimal image quality. Typical clustered-dot methods often possess some residual moiré. The typical clustered yellow configuration places yellow at 0° with a frequency that is ≈10% higher than the other screens. Low contrast moiré can be seen in many printed images for certain combinations of yellow and other colorants. Another common configuration for yellow utilizes a stochastic screen or error diffusion for yellow. That configuration results in a high degree of instability when used on many different printers. The result is inconsistency of color page-to-page and non-uniformity of color within a page.

There are several high quality, or enhanced, printing applications that require more than four image separations. For example, high fidelity ("hi-fi") color printing typically utilizes one or more additional primary colors to extend the gamut of a print engine. Two common choices of additional primaries are orange and green, but other colors, such as red, blue and violet may be used. A well known example of high fidelity printing is Pantone Hexachrome® printing. Low chroma printing employs an additional toner or ink with the same or similar hue as a conventional toner. For example, low chroma magenta may be used along with conventional magenta to enable smoother tone gradations and reduced texture in flesh tones compared to using conventional magenta alone. Typical low chroma, or light, colorants include light magenta, light cyan and gray. Other >4 colorant enhanced printing methods may employ special colorants such as white, metallics and fluorescents, and may have applications in security and special imaging effects.

Due to moiré considerations associated with additional clustered-dot halftone screens, the alternatives currently available for enhanced printing with >4 channel halftoning suffer from instability, less than desirable halftone structure appearance, or limitations on applications. For example, stochastic screens and error diffusion have been used for hi-fi color and low chroma toners, but the small dot sizes tend to produce unstable results for xerography and offset printing. Line screens have also been used, but the line structure tends to be considered undesirable unless used at very high frequencies, which can be unstable. Some methods utilize the same screen for a hi-fi colorant and for its complimentary colorant (e.g., same screen for cyan and orange), but that method can place limitations on the color management operations and does not apply to low chroma toners.

Commonly assigned U.S. Pat. No. 5,870,530, entitled: "System For Printing Color Images With Extra Colorants In Addition To Primary Colorants", discloses a "hi-fi" color printing system, wherein colorants of secondary colors beyond the regular CMYK primary colorants are available, the colorants of the secondary colors are substituted for combinations of the primary colorants in order to obtain a full color gamut. The functions by which colorants of the secondary colors are substituted for primary colorant are non-linear through a path in the color space.

Commonly assigned U.S. Pat. No. 5,892,891, entitled: "System For Printing Color Images With Extra Colorants In Addition To Primary Colorants", discloses a "hi-fi" color printing system, wherein colorants of hi-fi colors beyond the regular CMYK primary colorants are available, a main gamut obtainable with the CMYK colorants only is mutually exclusive with at least one extended gamut in which a hi-fi colorant is used and a complementary one of the CMY colorants is excluded. Because the main and extended gamuts are mutually exclusive, no more than four colorants are used in any part of the image, and no more than four halftone screens need be used to obtain any desired color.

The above indicated patents and citations provide background basis for the disclosure as taught in the specification which follows below, and further for each of the patents and citations above, the disclosures therein are totally incorporated herein by reference in their entirety for their teachings.

BRIEF SUMMARY

What is provided herein are systems and methods for digitally reproducing a moiré-free color halftone image using an enhanced halftone screen set consisting of a halftone screen for each of N colorants, where N>4. Also disclosed is an enhanced color halftoning screening apparatus for reproducing a moiré-free color halftone image using an enhanced halftone screen set consisting of a halftone screen for each of N colorants, N>4. Further disclosed are embodiments for disclosed generating a plurality of non-orthogonal halftone screen outputs for moiré-free enhanced color halftoning.

In one embodiment, rosette fundamental frequency vectors $V_{R1}$, $V_{R2}$ are defined that satisfy a length and sum requirement to meet visual acceptability standards according to:: $|V_{R1}|>f_{min}$, $|V_{R2}|>f_{min}$, and $|V_{R1} \pm V_{R2}|>f_{min}$. N halftone screens are defined for colorants i=1 to, N, respectively, possessing first and second frequency vectors ($V_{i1}$, $V_{i2}$), where no two screens possess identical fundamental frequency vector pairs. Fundamental frequency vectors are selected for the N halftone screens according to: $(V_{i1}, V_{i2})=(m_{i1}V_{R1}+m_{i2}V_{R2}, n_{i1}V_{R1}+n_{i2}V_{R2})$ for integer m's and n's, where at least one fundamental frequency vector or its conjugate satisfies one of the following: $V_{ik}=V_{R1}$, $V_{ik}=V_{R2}$, and $|V_{ik}|>2\max[|V_{R1}|, |V_{R2}|]$. In such a manner, the set of N different halftone screens used in combination produce moiré-free halftone output.

In another embodiment, a color halftoning screening apparatus is disclosed for reproducing a moiré-free color halftone image using an enhanced halftone screen set consisting of a halftone screen for each of N colorants, N>4. In one example embodiment, the color halftoning screening apparatus comprises: rosette fundamental frequency vectors $V_{R1}$, $V_{R2}$ that satisfy a length and sum requirement to meet visual acceptability standards according to: $|V_{R1}|>f_{min}$, $|V_{R2}|>f_{min}$, and $|V_{R1} \pm V_{R2}|>f_{min}$; N halftone screens for colors i=1, N, respectively possessing first and second frequency vectors ($V_{i1}$, $V_{i2}$), where no two screens possess identical fundamental frequency vector pairs; and fundamental frequency vectors for the N halftone screens according to: $(V_{i1}, V_{i2})=(m_{i1}V_{R1}+m_{i2}V_{R2}, n_{i1}V_{R1}+n_{i2}V_{R2})$ for integer m's and n's, where at least one fundamental frequency vector or its conjugate also satisfies one of the following: $V_{ik}=V_{R1}$, $V_{ik}=V_{R2}$, and $|V_{ik}|>2\max[|V_{R1}|, |V_{R2}|]$.

Also disclosed is a method for generating a plurality of non-orthogonal halftone screen outputs for moiré-free enhanced color halftoning. In one example embodiment, the method comprises: defining rosette fundamental frequency vectors ($V_{R1}$, $V_{R2}$) that satisfy a length and sum requirement to meet visual acceptability standards according to: $|V_{R1}|>f_{min}$, $|V_{R2}|>f_{min}$, and $|V_{R1} \pm V_{R2}|>f_{min}$; specifying a first and a second color halftone screen fundamental frequency vector for each of N halftone screens, N>4, according to: $(V_{i1}, V_{i2})=(m_{i1}V_{R1}+m_{i2}V_{R2}, n_{i1}V_{R1}+n_{i2}V_{R2})$ for integer m's and n's, where at least one of the fundamental frequency vectors or its conjugate must also occur off of second-order spectral hexagon.

BRIEF DESCRIPTION OF THE DRAWINGS

The patent or application file contains at least one drawing executed in color. Copies of this patent or patent application publication with color drawings will be provided by the Patent Office upon request and payment of the necessary fee. The foregoing and other features and advantages of the subject matter disclosed herein will be made apparent from the following detailed description taken in conjunction with the accompanying drawings, in which.

DETAILED DESCRIPTION

The teachings disclosed herein provide an enhanced color halftone configuration that produces consistent hexagonal rosettes free of moiré when printing an arbitrary number of color halftone separations. With the non-orthogonal halftone screen technology thus developed it is possible to design clustered-dot halftone screens sets consisting of a relatively large number of screens, such as 5 or more, which generate halftone outputs with rosettes appearing as ordered hexagons of identical shape. The relatively large number of screens can be used for enhanced printing applications, such as printing with high-fidelity colorants, light colorants, or special colorants, such as white, metallics and fluorescents. The hexagon rosettes have fundamental spatial frequencies that define a frequency lattice from which fundamental frequencies of the halftone screens can be selected. As a result, the halftone outputs are truly moiré-free, because there is no frequency component, fundamental or high-order harmonic, in single color or color combination, that is lower in frequency than the fundamental frequencies of the hexagon rosettes. The requirements for achieving these exemplary hexagon rosettes are specified by several frequency-vector equations, in combination with conventional requirements for multi-color moiré-free halftoning.

Figure 1:
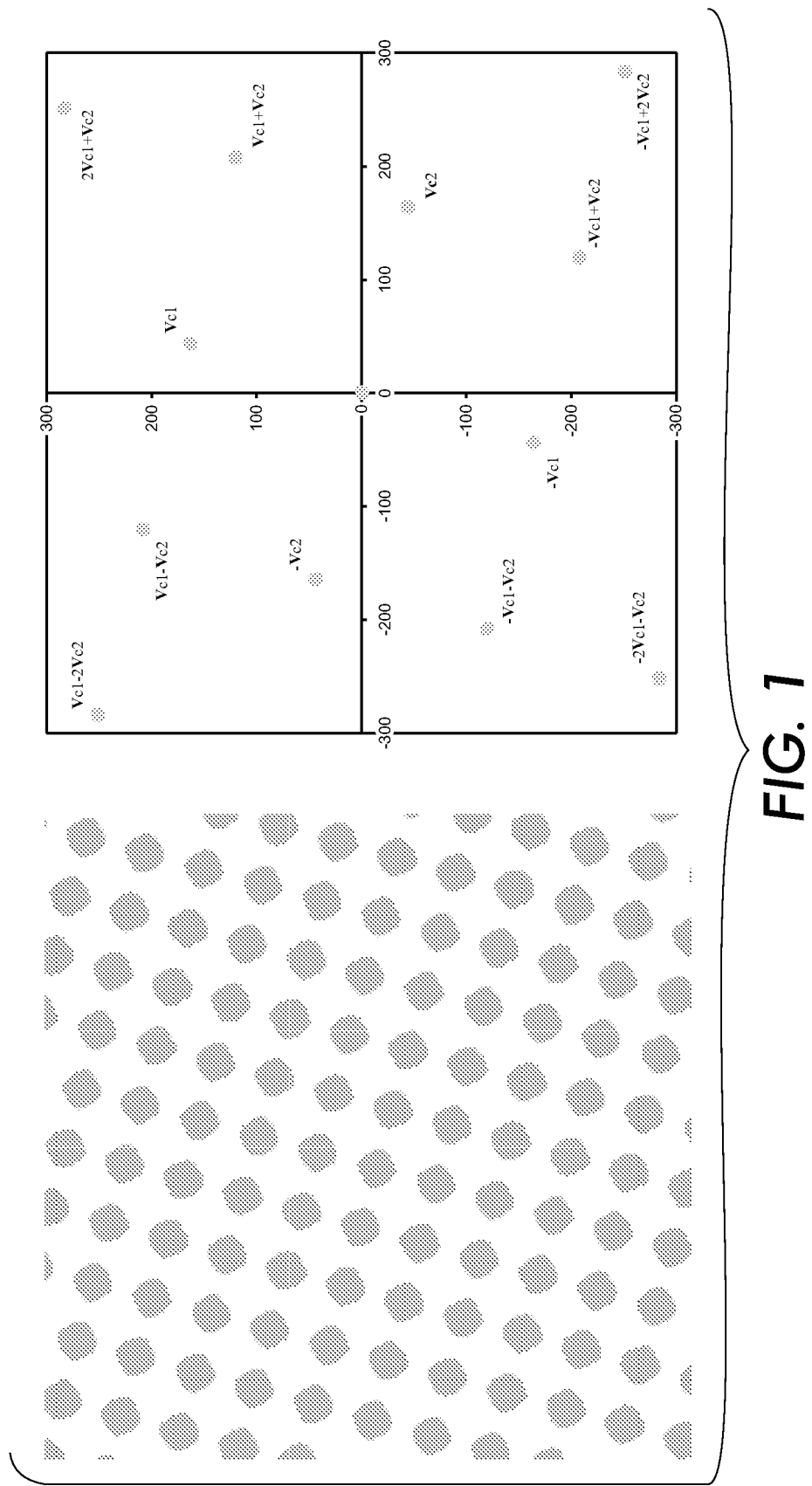
FIG. 1 depicts a halftone pattern created by the cyan screen of a color printing system, and along-side it the frequency representation for that cyan screen halftone pattern.
Figure 2:
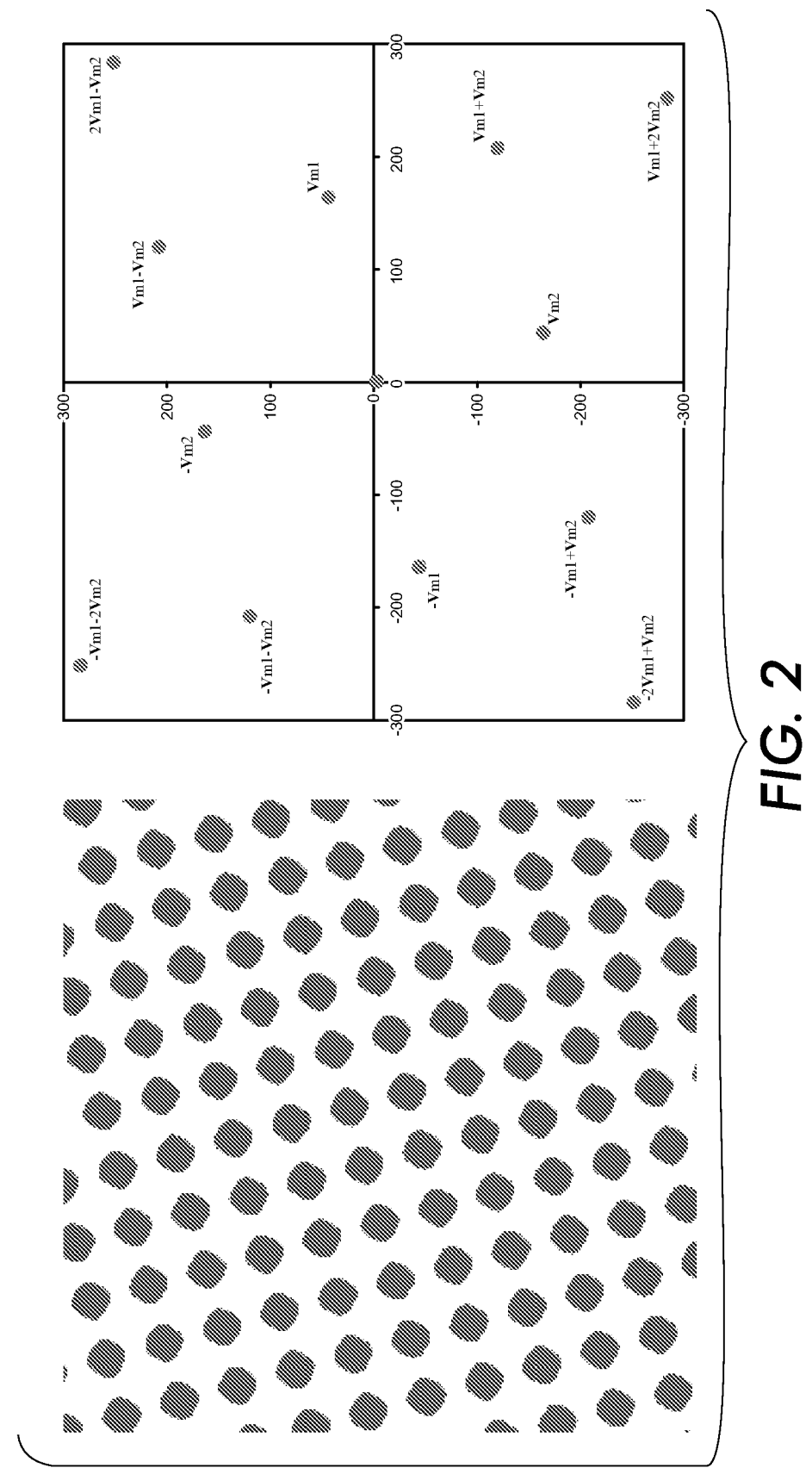
FIG. 2 depicts a halftone pattern created by the magenta screen of a color printing system, and along-side it the frequency representation for that magenta screen halftone pattern.
Figure 3:
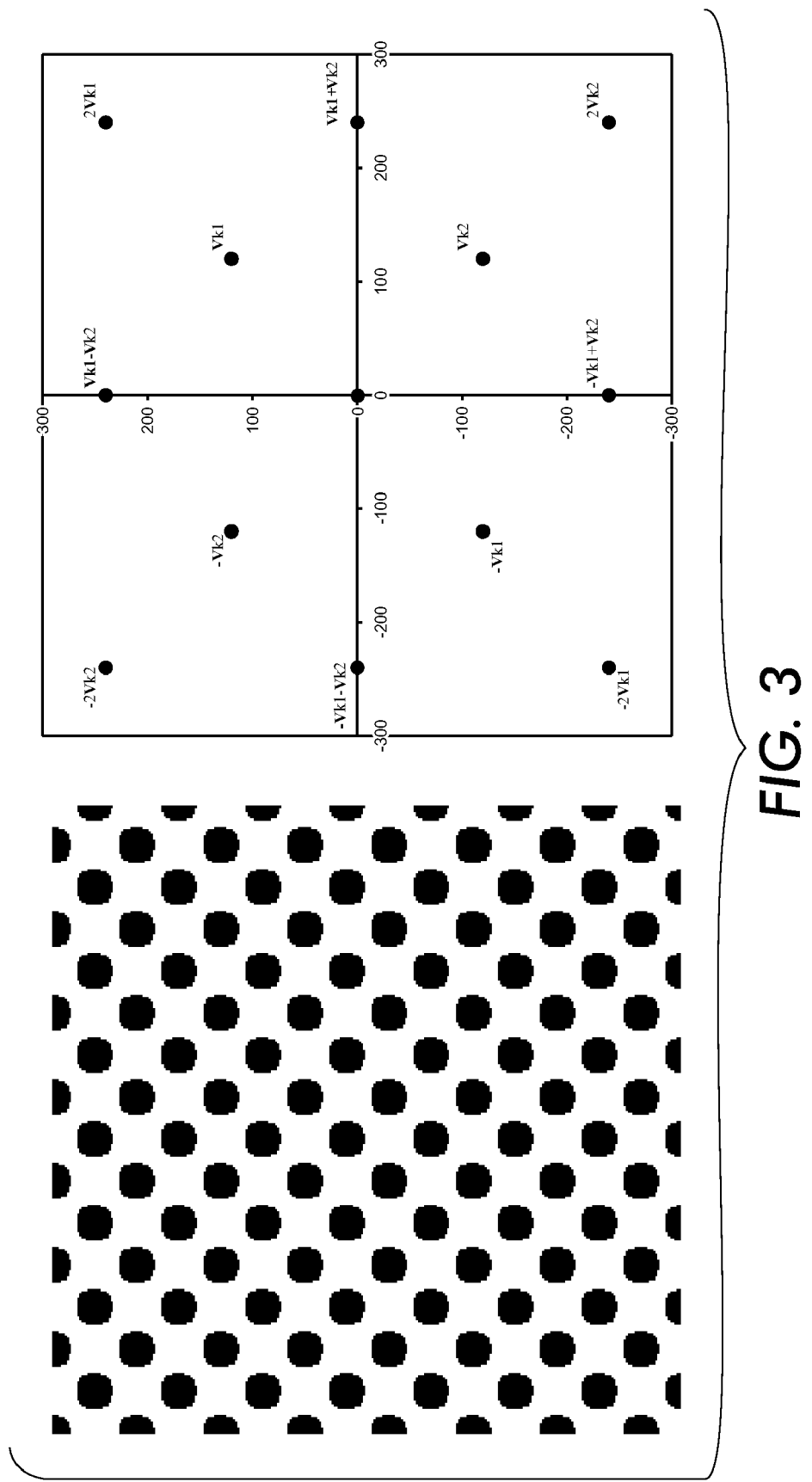
FIG. 3 depicts a halftone pattern created by the cyan screen of a color printing system, and along-side it the frequency representation for that black screen halftone pattern.

Most screening-based halftone methods use halftone screens in a two-dimensional tiling manner. Thus the corresponding halftone outputs possess strong periodic structures defined by the halftone screens. For example, in FIGS. 1-3 are three halftone patterns that demonstrate the outputs from a current exemplary color printer. The cyan pattern is the output of a 75° and −15° screen; the magenta pattern is the output of a, 15° and −75° screen; and the black is the output of a, 45° and −45° screen. All three patterns in FIGS. 1-3 show the halftone outputs as two-dimensional periodic structures (or quasi-periodical because of the multiple-dot-per cell, or super-cell approach) as the result of tiling square-shape screen cells.

Images can be also described by their Fourier transforms or their spatial frequency representations. As the result of tiling halftone screens, Fourier transforms of the halftone patterns in FIGS. 1-3 are dominated by discrete frequency components defined by the two fundamental halftone frequency vectors for each screen and their two-dimensional higher-order harmonics, or linear combinations of the fundamentals. For the following discussion in this specification, we use the notation illustrated by the transform plots in FIGS. 1-3 to represent the Fourier transform of halftone patterns. Only the locations of the fundamental halftone frequency vectors, $V_{c1}$, $V_{c2}$, $V_{m1}$, $V_{m2}$, $V_{k1}$, and $V_{k2}$, and some of their harmonics are shown in the spatial frequency coordinates as circular dots, and the amplitude and phase of each component are ignored in these illustrations. The sub 1 and sub 2 notation refers to vectors that are above (0° to 90°) or below (270° to 360°, or equivalently −90° to 0°) the 0° axis, respectively. We use this notation consistently within the present disclosure to represent the two quadrants. Unless otherwise noted, we use the subscripts c, m, y, and k, to aid in teaching the presently described halftoning processes due to the common practice of four-color printing with cyan, magenta, yellow, and black. While we teach using that notation, the concepts are general in that other colorants may be used. For example, we may use the notation $V_{m1}$ and use examples that refer to it as a frequency vector for the magenta screen, but it is to be understood that we intend it to generally imply a frequency vector in the first quadrant for some available colorant. Further, we note that colorants for particular screen geometries are interchangeable. For example, we may teach with yellow halftoned with a screen of a first geometry, and black halftoned with a screen of a second geometry, but it is practical and reasonable to assume that the screens may be interchanged and yellow may be halftoned with the screen of the second geometry and black the first.

The three plots in FIGS. 1-3 are the spatial frequency representations of the three halftone patterns in the figures, respectively. Of course, the halftones possess many higher order harmonics that are not shown in the plots due to limiting the range of the plots to ±300 cycles-per-inch (cpi) in both directions to simplify the plots for teaching the relevant concepts.

Figure 4:
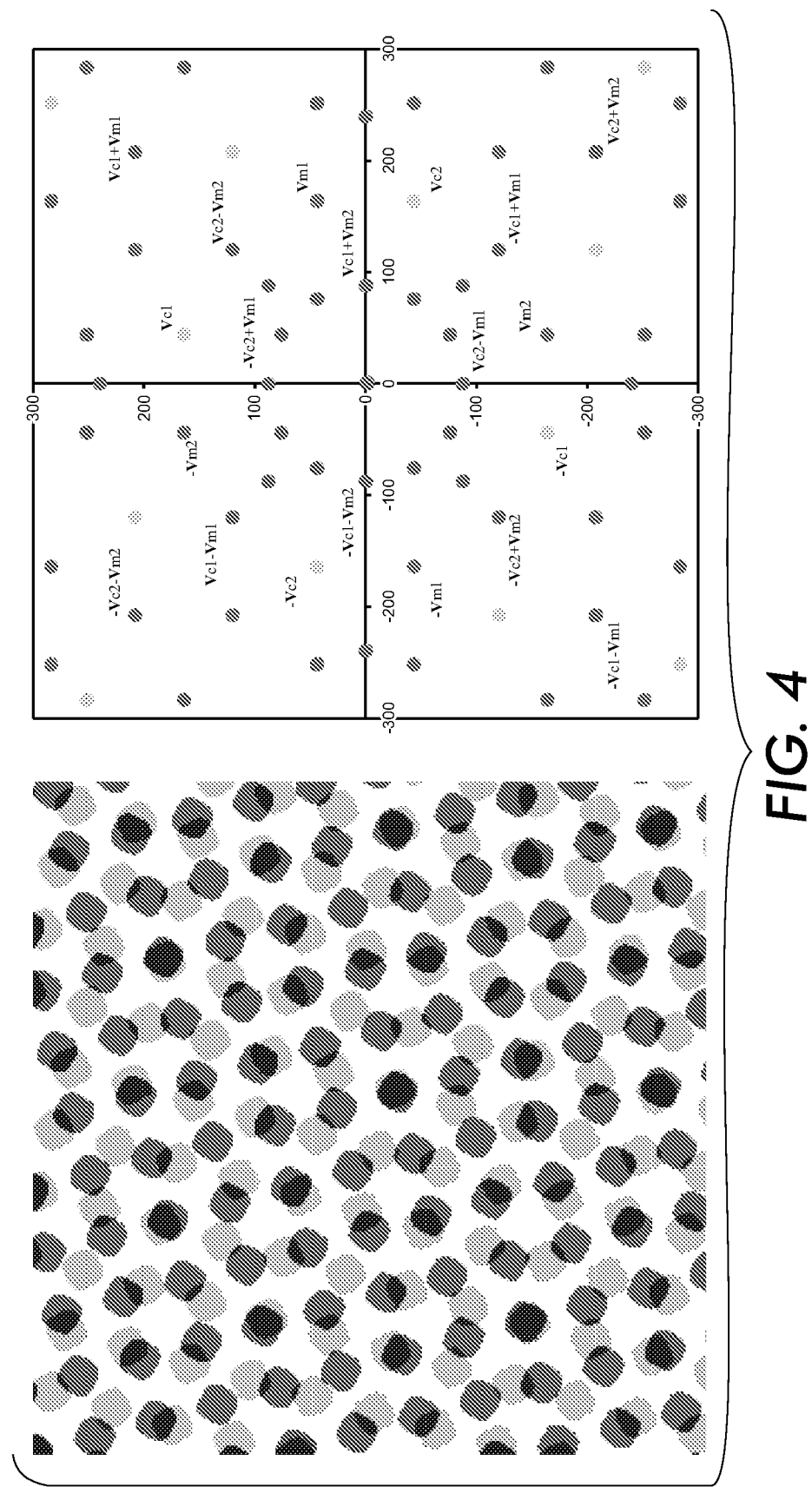
FIG. 4 depicts the superimposition of the cyan and magenta halftones as depicted in FIGS. 1 and 2 respectively, and along-side it the Fourier representation for that superimposition.

In color printing, more frequency components than the fundamental frequencies are typically created in the halftone image due to the superimposition of halftone screens for different process colors. Using Fourier analysis, we can express the result caused by such superimposition of two different colors as their frequency-vector difference, e.g., $V_{cm} = V_c \pm V_m$ where $V_x$ represents any of: $V_{x1}$, $-V_{x1}$, $V_{x2}$, $-V_{x2}$, and $V_{cm}$, is the combined vector. The sign definition of frequency vectors is rather arbitrary since each Fourier component has its conjugate, i.e., there is always a frequency vector $-V_c$ that represents the conjugate component of $V_c$. For each halftone dot screen, there are two fundamental frequency vectors, thus the color mixing of two screens for two different colors yields eight unique combined vectors for the fundamental frequency vectors alone. Considering the other harmonics of the halftone frequency vectors, the combinations can yield a large number of difference vectors. In FIG. 4, the superimposition of the cyan and magenta halftone patterns depicted in FIGS. 1 and 2 is shown on the left, and its frequency representation is on the right. Obviously, the frequency spectrum of the mixed colors is quite complicated and is certainly not a two-dimensional periodic function as is the single-color spectra shown in FIGS. 1 and 2, and this explains why the halftone pattern of the superimposition in FIG. 4 cannot be described as tiling a simple cell as it does in the simple monochromatic cases.

Figure 5:
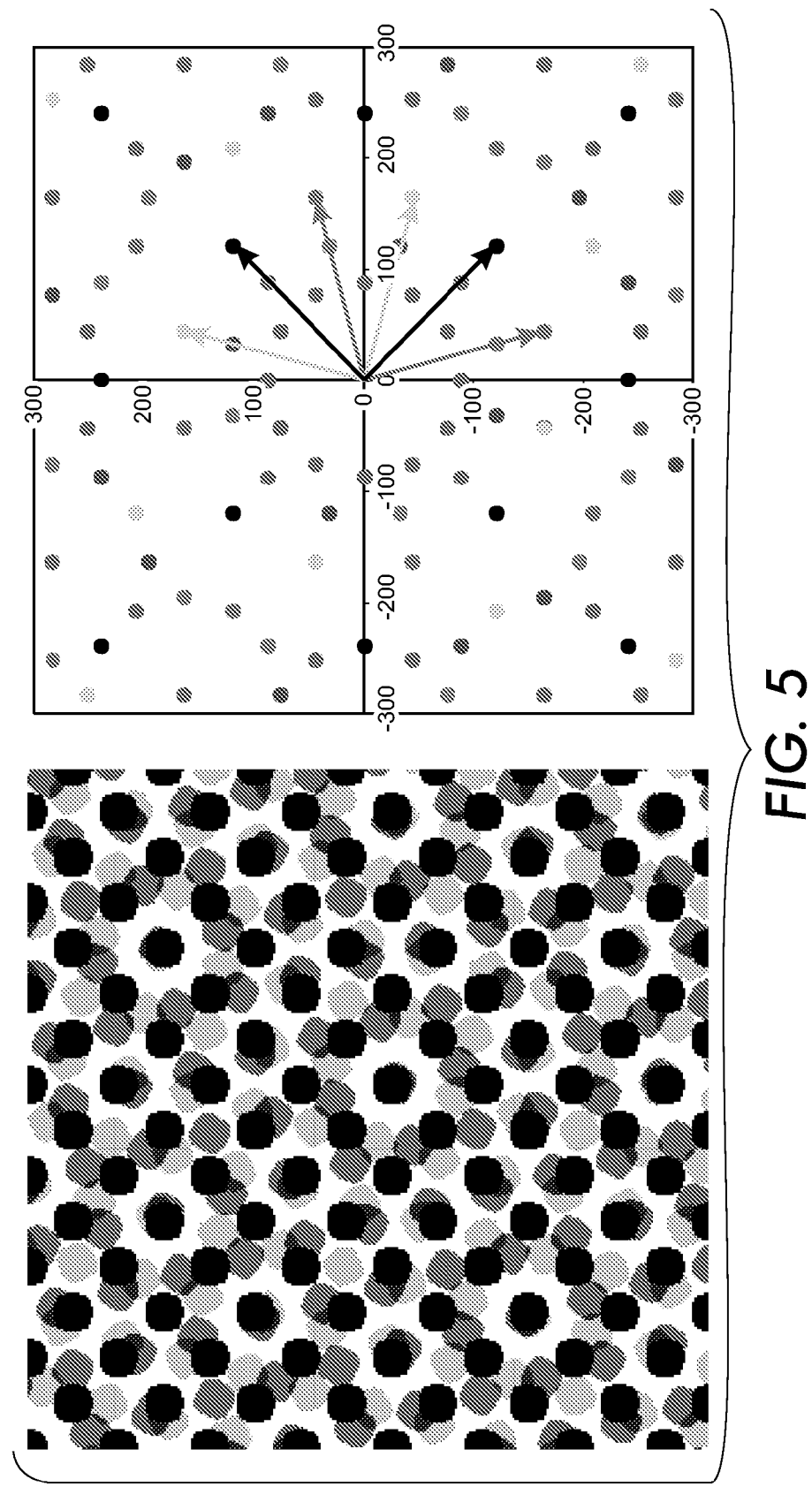
FIG. 5 depicts the superimposition of the cyan, magenta, and black halftones as depicted in FIGS. 1-3, respectively, and along-side it the Fourier representation for that superimposition.

When the superimposition involves three colors, typically, cyan, magenta and black, the situation becomes even more complex. As shown in FIG. 5, the halftone pattern, often referred to as the rosette pattern, is not a simple repeated pattern and its Fourier representation is even more complicated than that for the two-color case. In traditional press printing, a same halftone screen is rotated to exactly 15°, 75° and 45° for cyan, magenta and black, respectively. It has been proven that the rosette pattern resulting from such a halftone configuration is theoretically non-periodic (J. A. C. Yule, "*Principles of Color Reproduction*"). In other words, the rosette pattern never repeats on the same page.

The common strategy to avoid objectionable two-color moiré is to select frequency vectors that ensure that no two-color difference vector of the fundamental halftone frequency vectors is sufficiently small, or short in length, to be perceived as a noticeably low frequency. The two-color moiré-free condition can be summarized by:

$$|V_c \pm V_m| > V_{high}, \quad (1)$$

where $V_c$ represents any one of $V_{c1}$, $-V_{c1}$, $V_{c2}$, $-V_{c2}$; $V_m$ represents any one of $V_{m1}$, $-V_{m1}$, $V_{m2}$, $-V_{m2}$; and $V_{high}$ is a frequency limit set at somewhere between 50-70 cpi for just noticeable moiré.

It is well known that a troublesome moiré is the three-color moiré, which can appear in cyan-magenta-black prints produced by CMYK four-color printers. As an extension of the two-color case, one aspect of the three-color moiré-free condition can be summarized by:

$$|V_c \pm V_m \pm V_k| > V_{high}, \quad (2)$$

where $V_k$ represents any one of $V_{k1}$, $-V_{k1}$, $V_{k2}$, $-V_{k2}$, and $V_{high}$ is set similar to the two-color case. Since there are altogether thirty-two unique combinations of different color components for the left side of the inequality of Eq. (2), it stands as a matter of practicality that to make all three-color difference vectors as well as all two-color difference vectors large enough to avoid any color moiré is very difficult, unless the halftone screens have very high frequency fundamentals, say higher than 200 line-per-inch. Another aspect of the moiré-free condition is to make two of the three-color difference vectors null while keeping the rest large. Given that both the signs and the indices of frequency vectors are defined somewhat arbitrarily, without losing the generality, the three-color moiré-free condition can be specified by the following vector equation:

$$V_{c1} - V_{m1} + V_{k2} = 0, \quad (3a)$$

or, equivalently due to the conventional screen configuration, $$V_{c2} - V_{m2} - V_{k1} = 0. \quad (3b)$$

Figure 6A:
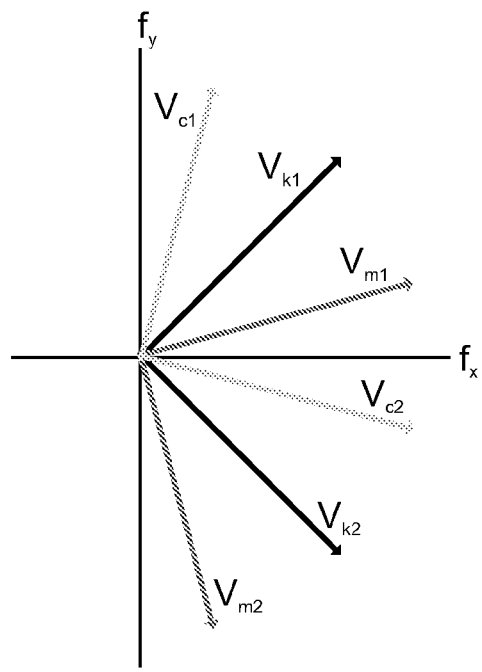
FIG. 6 depicts the frequency vectors of the cyan, magenta, and black halftones depicted in FIGS. 1-3, respectively.
Figure 6B:
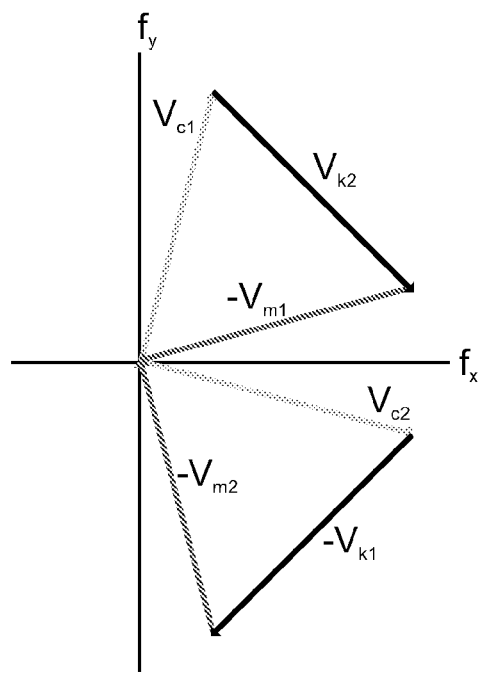

Eqs. (3a) and (3b), are two of all possible frequency combinations of the three colors. In most practical applications, the rest of the combinations satisfy the inequality of Eq. (2) for $V_{high}$ as large as $MIN[|V_c|, |V_m|, |V_k|]$ and are not specially specified, and the combination of halftone outputs produce a rosette appearance rather than objectionable moiré. The vector additions of Eq. 3 are illustrated in FIG. 6.

Most conventional halftone screens use square-shape halftone cells for tiling. Therefore, the two fundamental frequency vectors of each screen are not independent to each other. Once one of the two equations, either (3a) or (3b) is satisfied, the other one is automatically held. Recently, Wang et al. has taught halftone methods (U.S. Pat. No. 6,798,539 . . . ) using non-orthogonal halftone cells to construct halftone screens, or general parallelogram-shape halftone cells, for moiré-free color halftoning, in which case the two fundamental frequency vectors of each parallelogram-shape-based screen are independent to each other and thus satisfying both Eqns. (3a) and (3b) is required for the three-color moiré-free condition. We note that the term "non-orthogonal" as used in the present specification here refers to "not necessarily square," which is less restrictive than "strictly not orthogonal." Such terminology follows convention used in mathematics, where terms such as "non-linear" refers to "not necessarily linear."

Further concerning moiré-free non-orthogonal halftone configurations, U.S. Pat. No. 7,480,076, to Wang, a moiré-free color halftone configuration for clustered dots is disclosed. Unlike conventional methods, the disclosed method produces periodic hexagon rosettes of identical shapes. These exemplary hexagon rosettes have three fundamental spatial frequencies exactly equal to half of the fundamental frequency of the three halftone screens. The resultant halftone outputs are truly moiré free, as all the fundamentals and harmonic frequencies are multiples of and thus higher in frequency than the rosette fundamental frequency.

Figure 7:
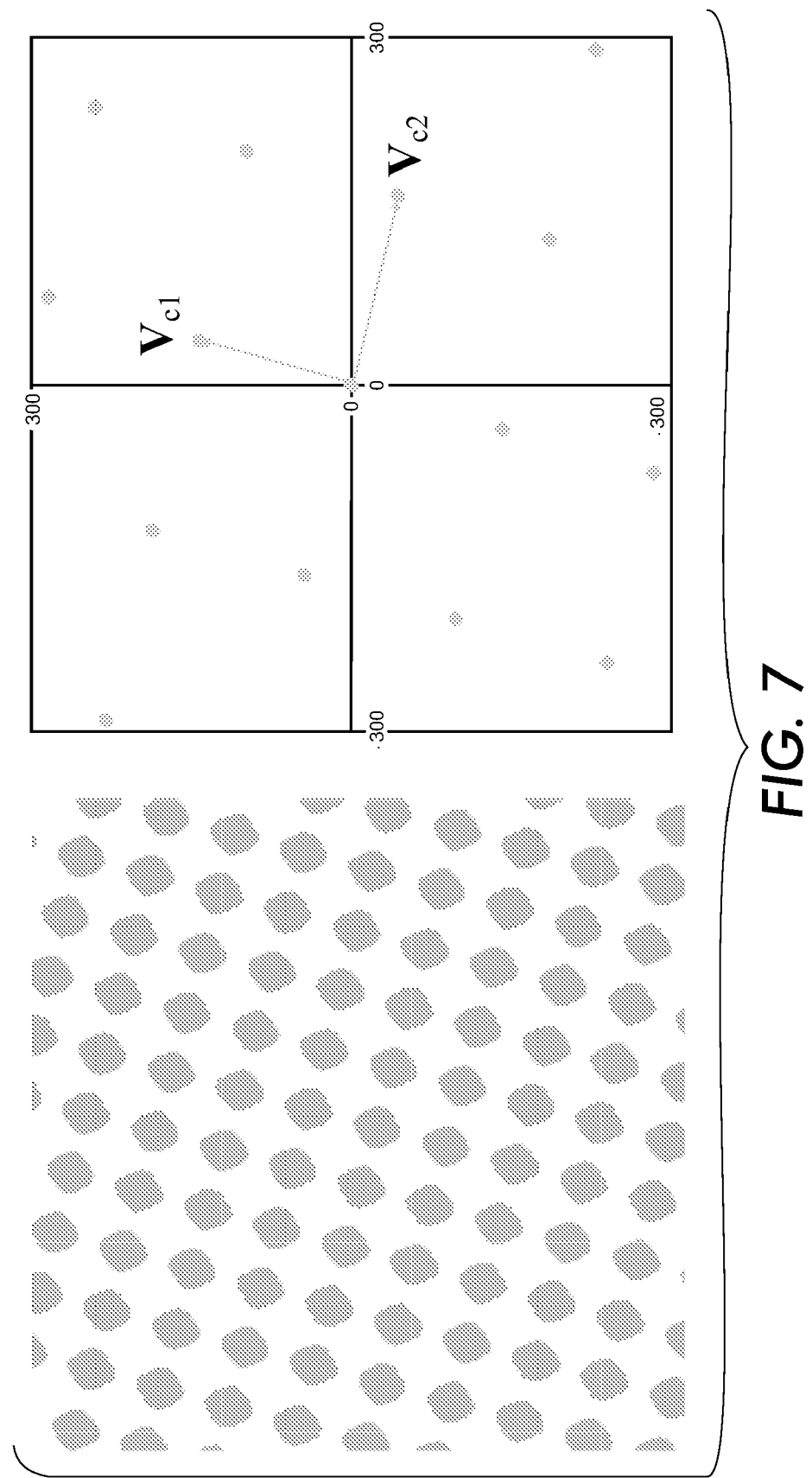
FIG. 7 depicts an exemplary cyan halftone pattern and its Fourier representation.
Figure 8:
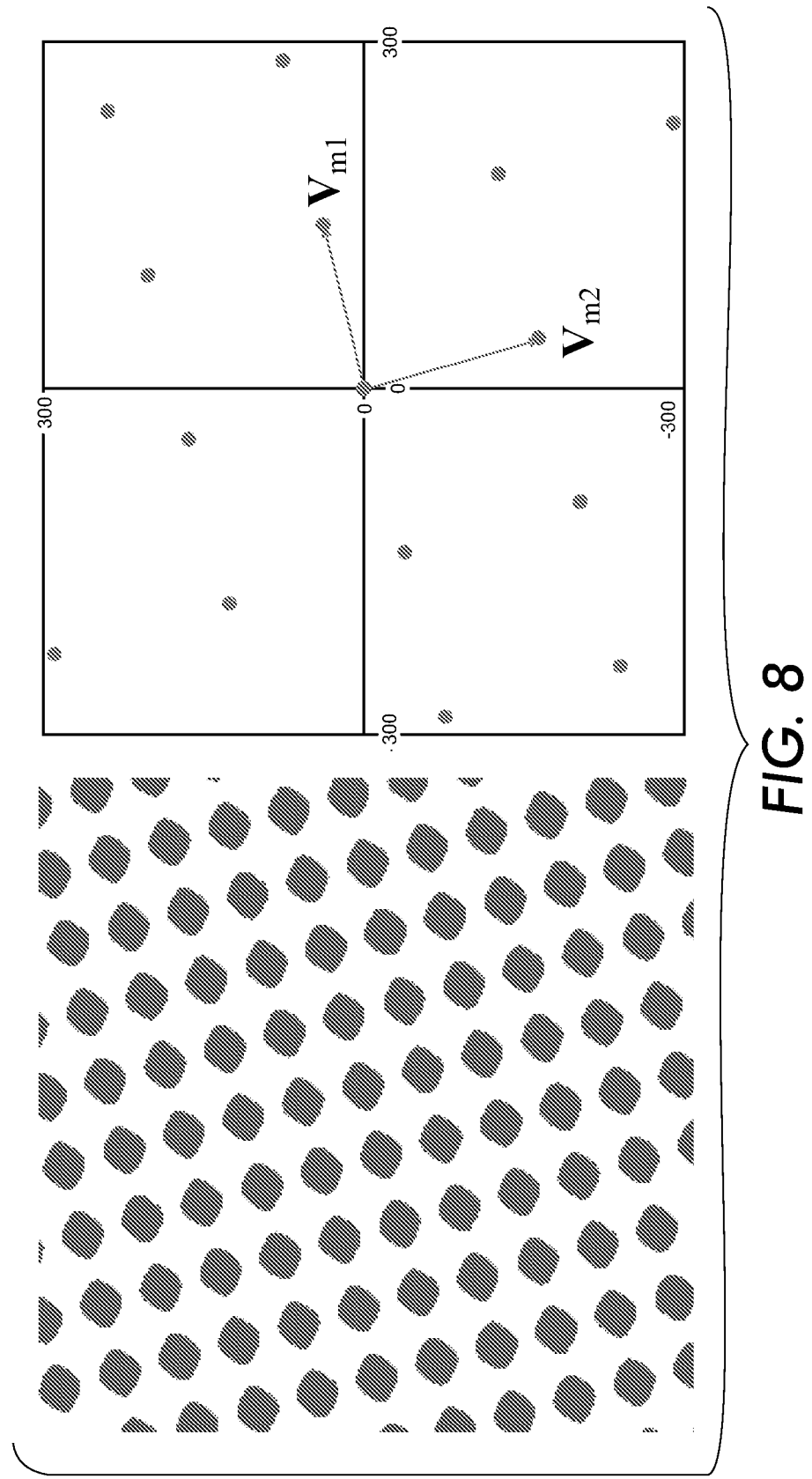
FIG. 8 depicts an exemplary magenta halftone pattern and its Fourier representation.
Figure 9:
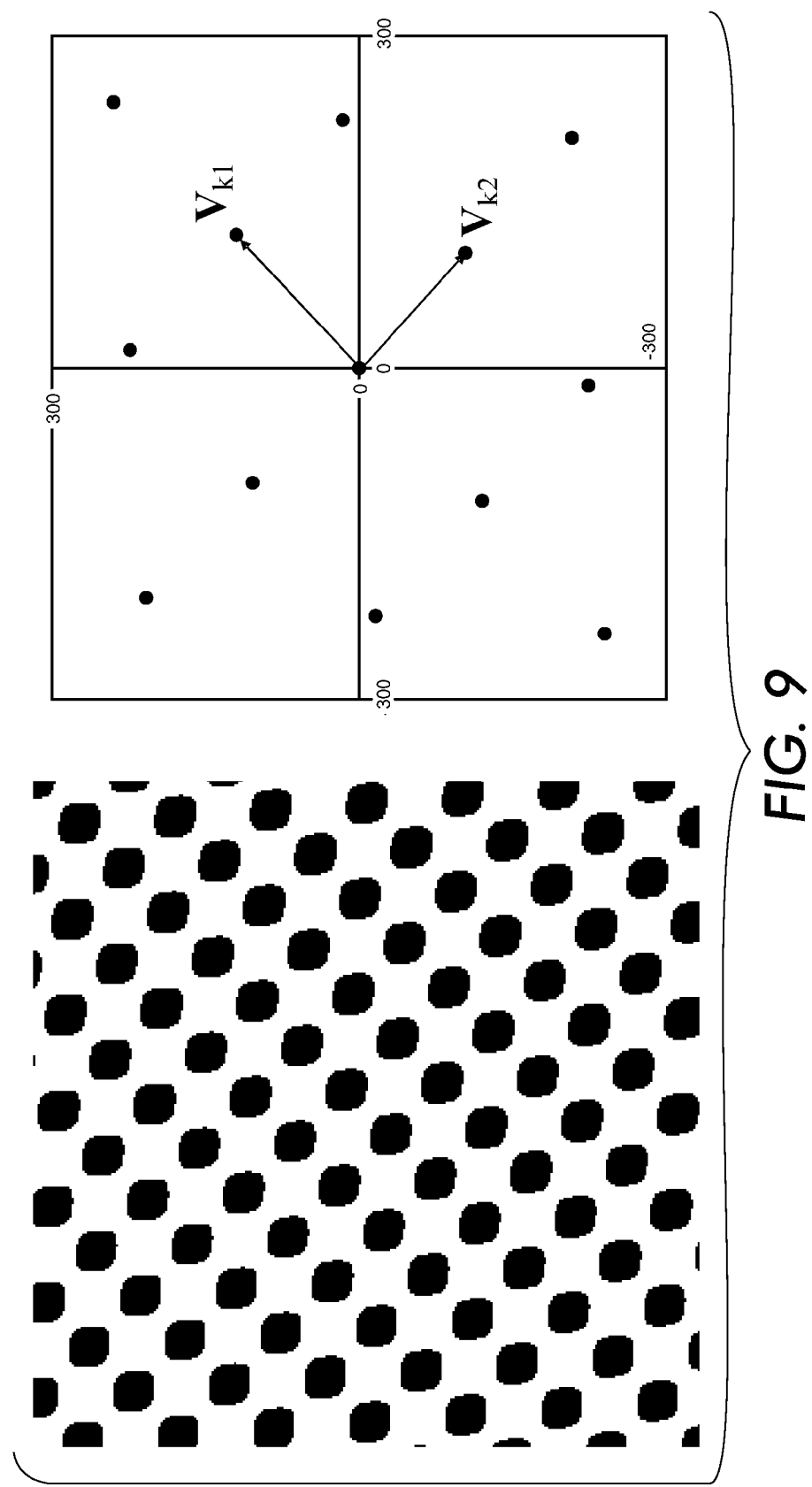
FIG. 9 depicts an exemplary black halftone pattern and its Fourier representation.

An example of a hexagonal rosette halftone configuration is easy to understand through extension of the previous classical configuration. Assume again halftone screens rotated to 15°, 45°, and 75°, respectively, for three different colors. In the present example, the halftones screens will satisfy Eq. (3), but will be constructed of rectangular cells, rather than square cells. The monochromatic halftone outputs of this configuration, shown as C, M and K halftone patterns, and their spectra are shown in FIGS. 7, 8, and 9, respectively. The halftones have similar appearances as the ones of the classical configuration shown in FIGS. 1, 2 and 3, with the difference being that the repeated halftone patterns in the current case is a rectangular cell with a ratio between the lengths of the two sides equal to 0.866, or exactly $\cos(30°)$. The frequency representations of the halftone patterns show that fundamental frequencies vectors of each pattern are perpendicular to each other and the ratio of the two frequencies are also equal to $\cos(30°)$.

Figure 10:
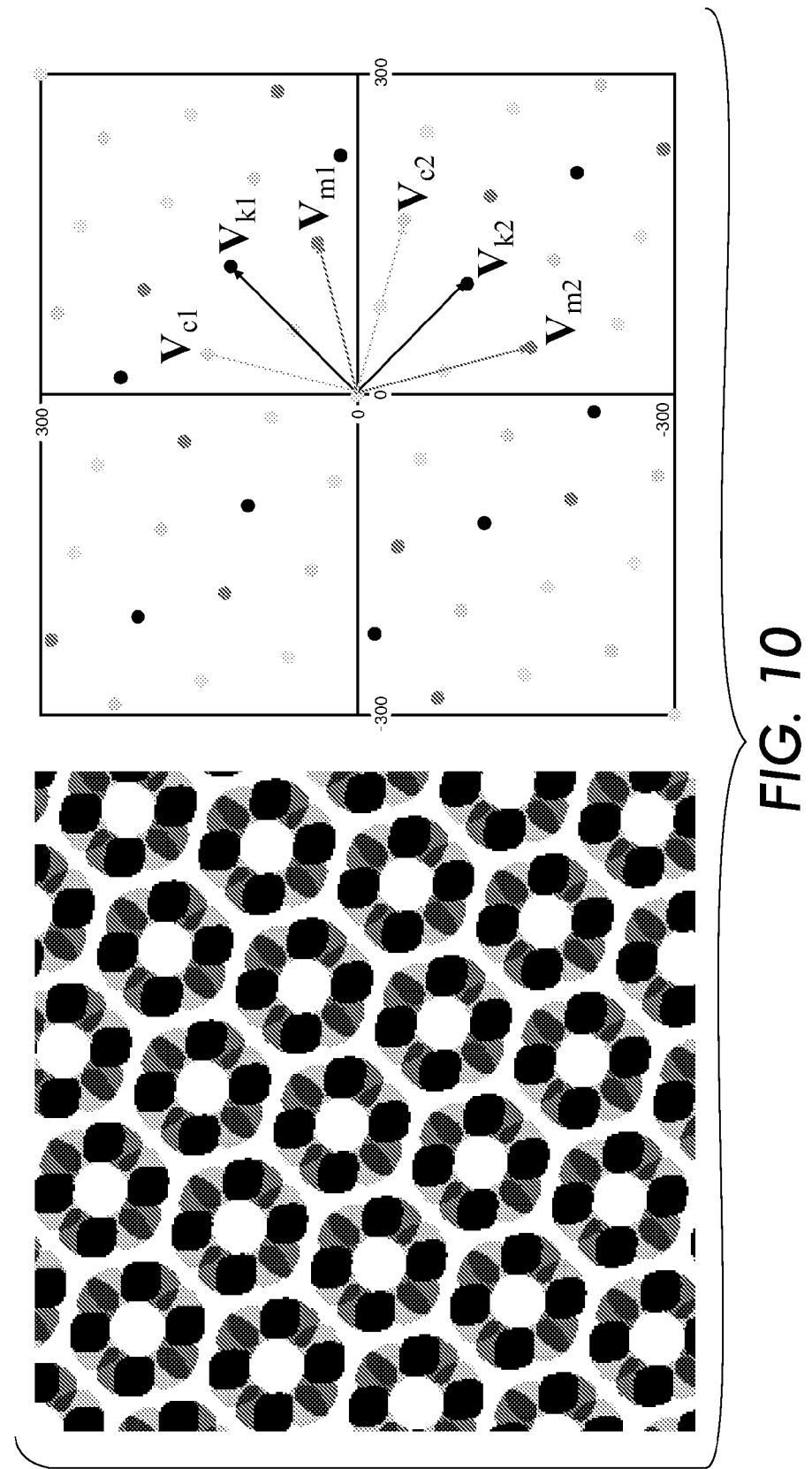
FIG. 10 depicts the superimposition of exemplary cyan, magenta, and black halftone patterns, with the corresponding Fourier representation for that exemplary superimposition along-side.

In FIG. 10, the superimposition of the C, M, and K halftone patterns of FIGS. 7, 8 and 9 is shown on the left, and the frequency representation of the superimposition is shown on the right. In the frequency representation, fundamental frequencies and harmonics of each monochromatic screen are illustrated by dots of the color of that screen. Gray dots indicate a frequency formed by the interactions of multiple screens. Despite the similarity between the monochromatic halftone outputs and spectra of the classical configuration and the present configuration, the superposition shown in FIG. 10 reveals significant differences. Comparing the hexagonal rosette pattern in FIG. 10 with the conventional one in FIG. 5, we see that the rosette of FIG. 10 is much simpler and more uniform, which results in a more pleasing texture.

Besides the pleasant appearance of the rosettes, an interesting observation is that all frequency components, including all fundamental frequencies and the respective harmonics of the monochromatic halftones, and frequencies due to all possible color combinations, can be located a hexagonal grid in the Fourier representation. The hexagonal grid can be seen by drawing a line connecting the nearest neighbors of any point in the spectra.

The teaching provided herein utilizes an arbitrary number of clustered-dot screens in an exemplary configuration to achieve halftone outputs with uniform rosettes that appear as tiled hexagons all of identical shape and are free of moiré. Certain conditions must be satisfied for such outputs and they can be specified either in the spatial domain, where shapes of halftone cells for different colors are defined by spatial vectors, or in the frequency domain, where halftone screens are specified by frequency vectors. In the disclosure that follows, these certain conditions to be satisfied will be specified in the frequency domain by use of frequency vectors.

The halftoning method, and resulting configuration taught in the present disclosure are based on defining rosette fundamental frequency vectors, of sufficiently high frequency and angle separation, that can be used to generate a hexagonal lattice of rosette harmonics. The lattice is generated by linear combinations of the rosette fundamental frequency vectors. Angles and frequencies for individual halftone screens are chosen from the rosette lattice points. A screen set selected in such a manner is moiré free because no combination of frequency lattice points can produce a beat lower than the two rosette frequency vectors used to generate the lattice. The lattice structure defined by the rosette makes it possible to choose pairs of frequency vectors for an almost arbitrary number of colorants without introducing any moiré in an N-color combination. Practical frequency lattices can be realized through the use of non-orthogonal screens.

Figure 11:
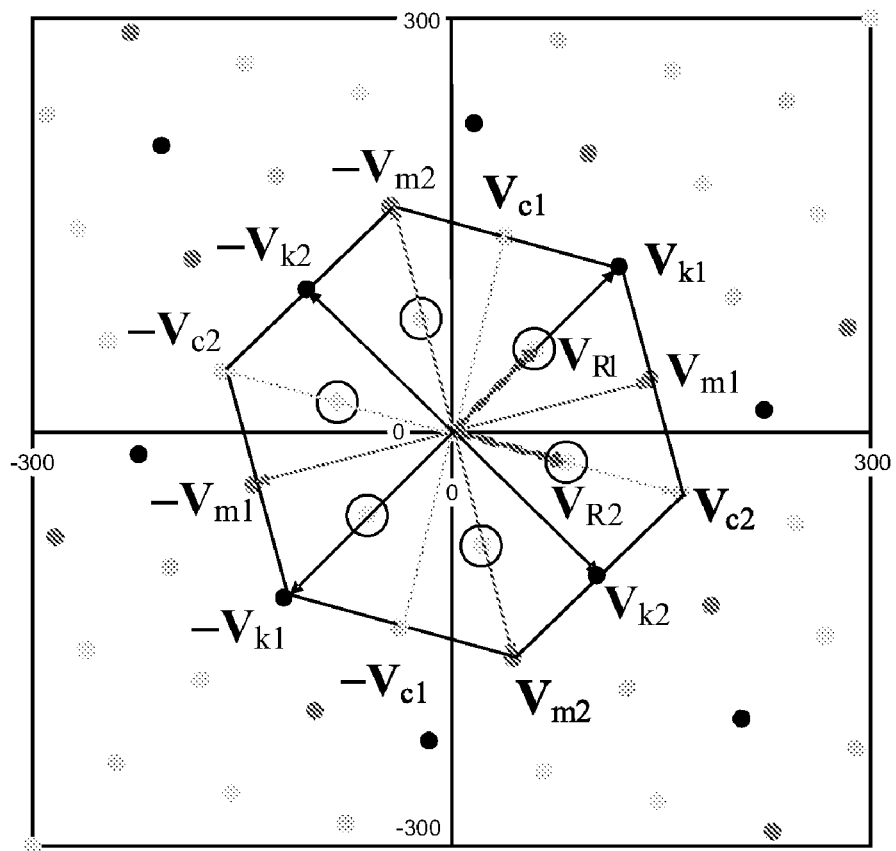
FIG. 11 depicts the Fourier representation of FIG. 10 with the rosette vectors and halftone fundamental spectral hexagon illustrated.

To better understand this rosette vector concept, consider the example of FIG. 10, redrawn in FIG. 11 with rosette vectors $V_{R1}$, $V_{R2}$ shown as red dashed vectors, and the lowest frequency components of the rosette are shown as circles. Note that is it easy to see that the set of lowest frequency components form the vertices of a hexagon. We refer to the hexagon formed by the lowest frequency components as the "first-order spectral hexagon." The relationships between the screen frequency vectors and rosette vectors are given by:

$$V_{c1} = 2V_{R1} - V_{R2}$$

$$V_{c2} = 2V_{R2}$$

$$V_{m1} = V_{R1} + V_{R2}$$

$$V_{m2} = -2V_{R1} + 2V_{R2}$$

$$V_{k1} = 2V_{R1}$$

$$V_{k2} = -V_{R1} + 2V_{R2}$$

The conjugate fundamental frequency vectors are also shown in FIG. 11. The figure shows that the set of all halftone fundamental frequencies can be connected to form a hexagon, illustrated in FIG. 11 as a thin black line. The halftone fundamental frequencies form the vertices as well as define points that roughly bisect the sides of the hexagon. This hexagon connects the frequency components that lie just outside of the "first-order spectral hexagon." We refer to this hexagon as the "second-order spectral hexagon."

While it is interesting to describe an existing screen set with a rosette lattice formalism, we teach extending that formalism to derive new screen configurations with an arbitrary number of halftone separations.

A mathematical statement of the general principle of N-halftone lattice-based screen configurations can be written by considering a frequency lattice structure defined by rosette vectors $V_{R1}$, $V_{R2}$. To avoid objectionable low frequency texture and moiré, we require:

$$|V_{R1}| > f_{min}, |V_{R2}| > f_{min}, \text{ and } |V_{R1} \pm V_{R2}| > f_{min}. \quad (4)$$

Typically, to meet visual acceptability standards, $f_{min}$ can be set to be approximately 100 cpi. But, lower quality printed material could use $f_{min}$ as low as 50 cycles/inch, or perhaps lower, while high quality printed material might require: $f_{min}$=150 cpi.

For a screen configuration with N halftone screens, let $V_{i1}$, $V_{c2}$ respectively denote first and second fundamental frequency vectors for screens i=1, 2, . . . , N, where $V_{i1}$, $V_{i2}$ are chosen to satisfy:

$$(V_{i1}, V_{i2}) = (m_{i1}V_{R1} + m_{i2}V_{R2}, n_{i1}V_{R1} + n_{i2}V_{R2}) \text{ for integer m's and n's.} \quad (5)$$

Exemplary halftone configurations are generated by utilizing configurations where at least one halftone fundamental frequency vector $V_{ik}$ deviates from occurring on the second-order spectral hexagon. Deviation from the second-order spectral hexagon can be specified by requiring at least one fundamental frequency vector or its conjugate to satisfy one of the following: $V_{ik}=V_{R1}$, $V_{ik}=V_{R2}$, and $|V_{ik}|>2\max[|V_{R1}|, |V_{R2}|]$.

To better understand the halftone configuration taught herein, consider extending the rectangular cell example of FIGS. 7-11 to a six colorant configuration, where the fourth, fifth, and sixth colorants are chosen to be yellow, red and green, respectively. Exemplary m and n values that are consistent with the present teaching are as follows:

| Cyan:    | $m_{c1}$ = 2 | $m_{c2}$ = −1 | $n_{c1}$ = 0  | $n_{c2}$ = 2 |
|----------|--------------|---------------|---------------|--------------|
| Magenta: | $m_{m1}$ = 1 | $m_{m2}$ = 1  | $n_{m1}$ = −2 | $n_{m2}$ = 2 |
| Black:   | $m_{k1}$ = 2 | $m_{k2}$ = 0  | $n_{k1}$ = −1 | $n_{k2}$ = 2 |
| Yellow:  | $m_{y1}$ = 3 | $m_{y2}$ = −2 | $n_{y1}$ = 1  | $n_{y2}$ = 2 |
| Red:     | $m_{r1}$ = 2 | $m_{r2}$ = 1  | $n_{r1}$ = −2 | $n_{r2}$ = 3 |
| Green:   | $m_{g1}$ = 3 | $m_{g2}$ = −1 | $n_{g1}$ = −1 | $n_{g2}$ = 3 |

Figure 12:
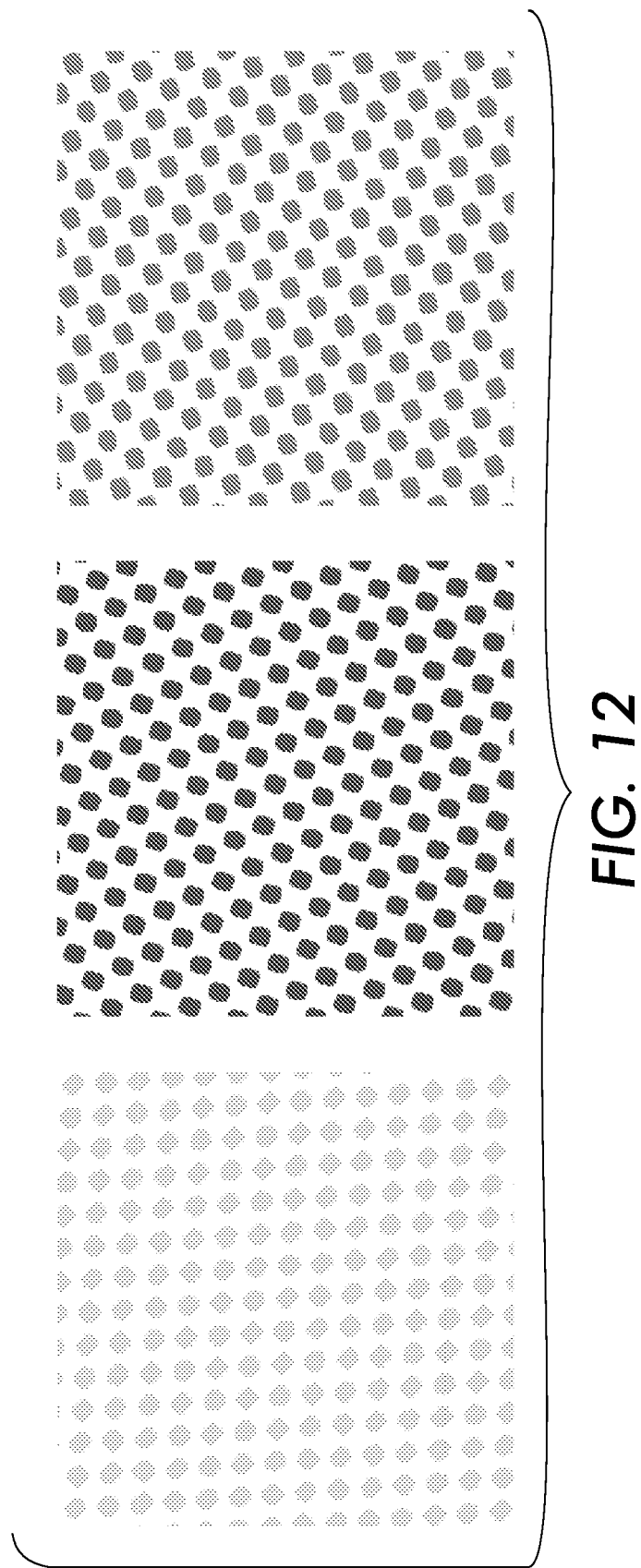
FIG. 12 depicts yellow, red and green halftone patterns.
Figure 13:
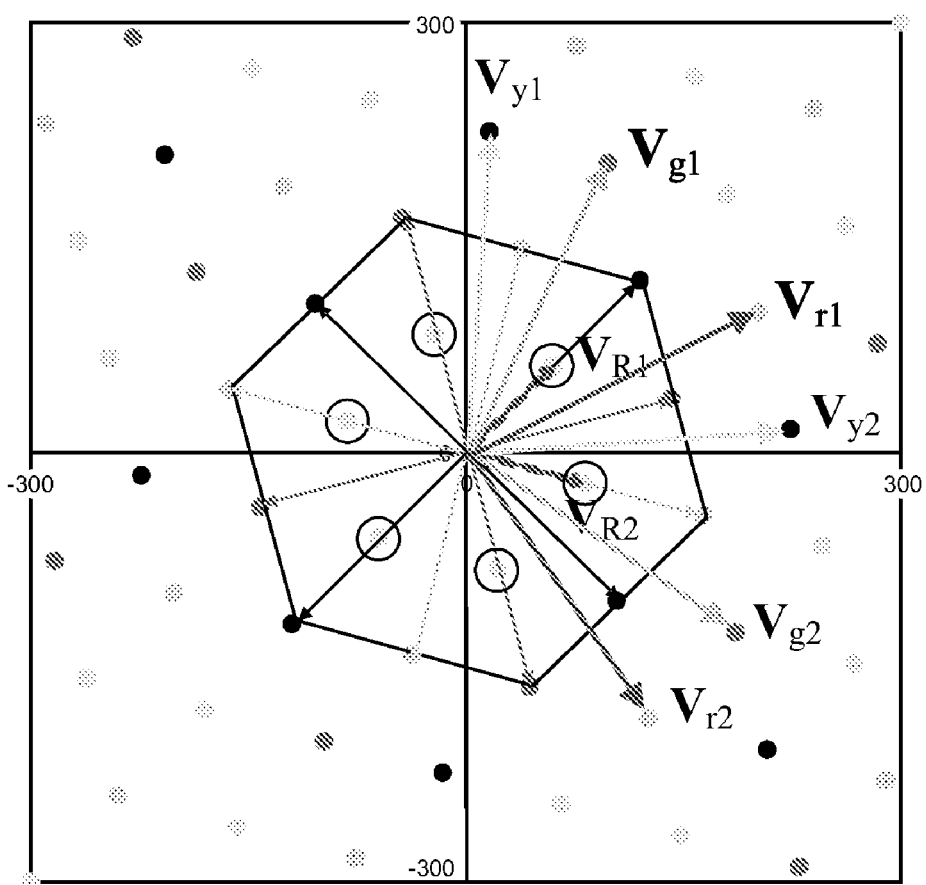
FIG. 13 depicts the fundamental frequency vectors for the yellow, red and green screens, superimposed onto the Fourier representation of cyan, magenta, and black screens.
Figure 14:
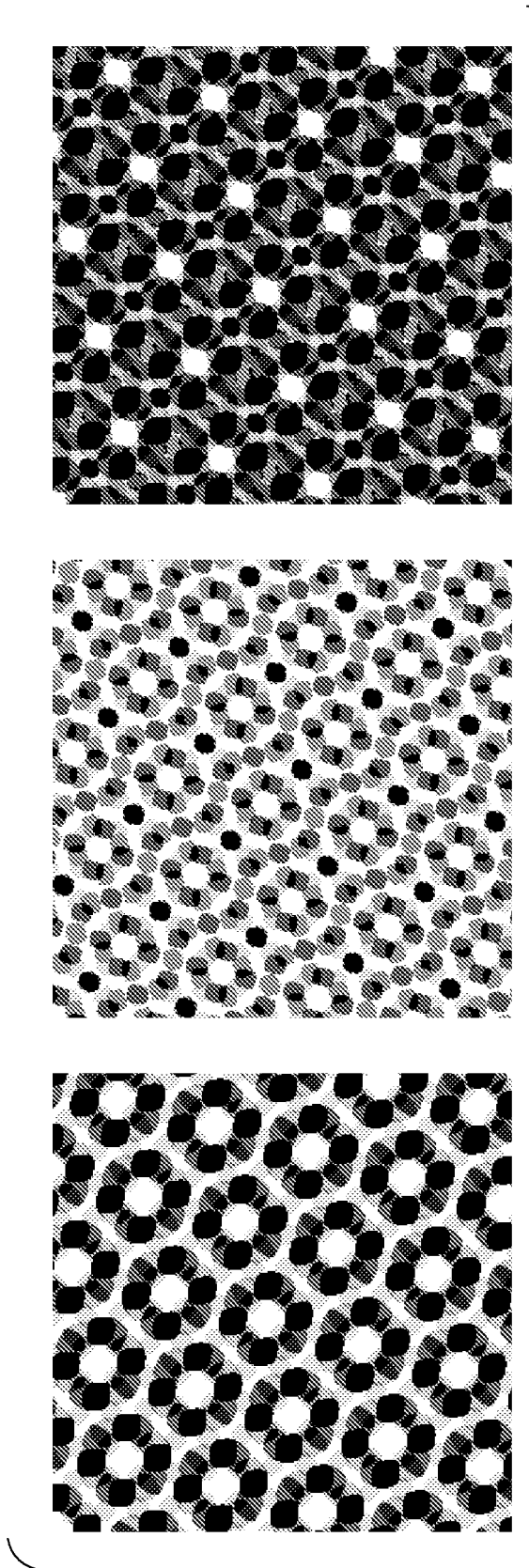
FIG. 14 depicts the superimposition of screens depicted in FIGS. 7, 8, and 12, where superimposition of the cyan, magenta, black, and yellow screens is on the left, the superimposition of the yellow and green screens is in the middle, and the superimposition of all six screens is on the right.

Halftone screen outputs for the fourth, fifth and sixth screens are shown in FIG. 12, and the respective fundamental frequency vectors are shown in FIG. 13. In FIG. 13 it can be seen that the fundamental frequency vectors of these fourth, fifth and sixth screens deviate from the second-order spectral hexagon. Superimpositions of halftone outputs are shown in FIG. 14. The left side shows cyan, magenta, black, and yellow, the center shows yellow, red and green, and the right side shows the superimposition of all six colorant. Observe that a regular rosette pattern is formed in all cases and no moiré is present.

Often, it is desirable to avoid dot-off-dot/dot-on-dot configurations due to misregistration sensitivity. That can be achieved by specifying halftone fundamental frequency vectors such that any $(V_{i1}, V_{i2})$ vector pair is not equal to any other $(V_{j1}, V_{j2})$ vector pair. That is, no two screens possess identical fundamental frequency vector pairs. On the other hand, if dot-off-dot/dot-on-dot screens are desired, say for reasons of increased gamut or reduced texture, then at least one $(V_{i1}, V_{i2})$ vector pair is specified to equal another $(V_{j1}, V_{j2})$ vector pair.

It can be desirable to use screens that do not require large |m| |n|, say >6 or 8, because the frequency of those screens might be beyond the resolution of common printing processes, but note that certain high resolution processes (e.g., high resolution proofers) may allow a much higher frequency.

To achieve a balance between minimizing visibility and maximizing stability, it is often desirable to have particular screens at a relatively low frequency, but not as low as the rosette frequency. For example, screens for C, M, and K could be chosen such that $$2 \leq |m_{i1}| + |m_{i2}| + |n_{i1}| + |n_{i2}| \leq 4. \quad (6)$$

In some cases, a screen may possess low visibility due to the hue of the colorant or amount of colorant required. For example, the human visual system has low acuity for yellow. In such cases, the low visibility screen can be defined by small values of m and n, e.g., one or both of the yellow vectors could equal a rosette vector, $V_{y1}=V_{R1}$, $V_{y2}=V_{R2}$, where $m_{y1}=1$, $m_{y2}=0$, $n_{y1}=0$, $n_{y2}=1$.

Ishii in US Publication No. 2004/0109184, includes a fourth screen in a halftone configuration in a moiré-free manner by setting its frequency vectors to be the same as the frequency vectors of two other screens (e.g., $V_{y1}=V_{k1}$, $V_{y2}=V_{c1}$). Since no new frequency vectors are added to the system, no new moiré components are generated. Also note that the fourth screen shares vectors from two different screens, so it is angularly displaced from any one screen. This angular displacement allows the screen to possess a degree of color-shift insensitivity to misregistration similar to other rotated screen designs. Further, note that at least one screen must not be orthogonal to achieve such frequency vector sharing.

Frequency vector sharing can be employed within a configuration according to the teachings disclosed herein. For example, a first screen can be included in the configuration by setting a first fundamental frequency vector of that screen to be equal to a first fundamental frequency vector of a second screen, while not setting its second fundamental frequency vector equal to the second fundamental frequency vector of the second screen. Since the first screen does not share both fundamental frequency vectors of the second screen, it is still angularly displaced from that second screen. This angular displacement allows the screen to possess color-shift insensitivity to misregistration similar to other rotated screen designs.

Line screens can be generated for a halftone configuration according to the teachings herein by selecting m's and n's such that one vector of the pair has length 0 ($|V_i|=0$).

For printing dot screens with 3 or more color separations it is typically desirable to have the rosette vectors $V_{R1}$, $V_{R2}$ separated by ≈30° or ≈60° to provide a pleasant hexagonal appearing rosette.

One particular set of clustered dot screens that deviates from classical angles has been designed that satisfies the teachings herein to provide hexagonal-rosette printing with up to 7 screens. Below are the frequency vectors for this exemplary halftone screen set. All frequency components are measured in units of cpi, and frequency angles are defined with respect to the horizontal y-axis. The figures described below show the frequency spectra for the rosettes and individual color separations. Examples of overlay colors are provided. In all cases, uniform, moiré-free, minimum rosettes are formed.

Rosette: $V_{R1}$=90.1 cpi @56.3°, $V_{R2}$=90.1 cpi, @−56.3°
Color1: $V_{11}$=2$V_{R1}$−$V_{R2}$=167.7 cpi @26.6°
$V_{12}$=2$V_{R2}$=180.2 cpi @−56.3°
Color2: $V_{21}$=2$V_{R1}$=180.2 cpi @56.3°
$V_{22}$=$V_{R1}$−2$V_{R2}$=167.7 cpi @−26.6°
Color3: $V_{31}$=$V_{R1}$−$V_{R2}$=150 cpi @) 90°
$V_{32}$=2$V_{R1}$+2$V_{R2}$=200 cpi @0°
Color4: $V_{41}$=2$V_{R1}$=180.2 cpi @56.3°
$V_{42}$=2$V_{R2}$=180.2 cpi @−56.3°
Color5: $V_{51}$=2$V_{R1}$−$V_{R2}$=167.7 cpi @26.6°
$V_{52}$=$V_{R1}$−2$V_{R2}$=167.7 cpi @) −26.6°
Color6: $V_{61}$=2$V_{R1}$+2$V_{R2}$=200 cpi @0°
$V_{62}$=−$V_{R1}$+2$V_{R2}$=230.5 cpi @−77.5°
Color7: $V_{71}$=2$V_{R1}$−$V_{R2}$=230.5 cpi @77.5°
$V_{72}$=2$V_{R1}$+2$V_{R2}$=200 cpi @0°

Figure 15:
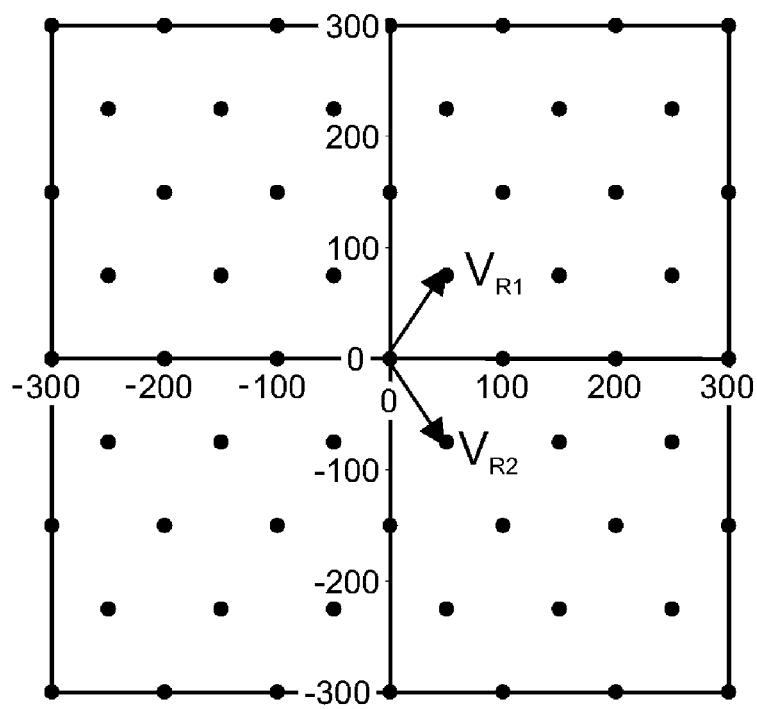
FIG. 15 depicts the Fourier representation of a hexagonal rosette according to the teachings herein.
Figure 16:
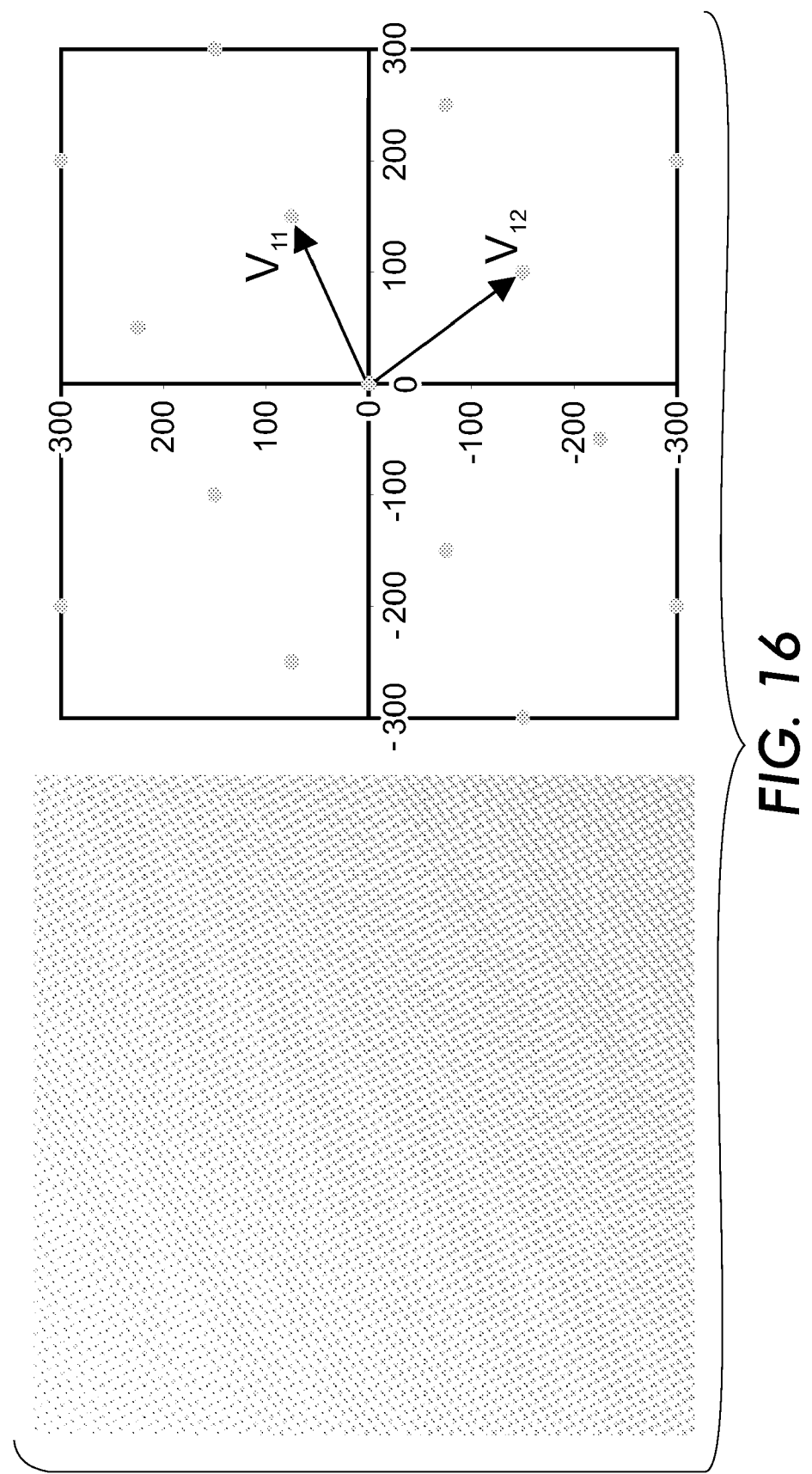
FIG. 16 depicts a halftone pattern created by the colorant 1 exemplary halftone screen of a color printing system, and along-side it the Fourier representation of that screen.
Figure 17:
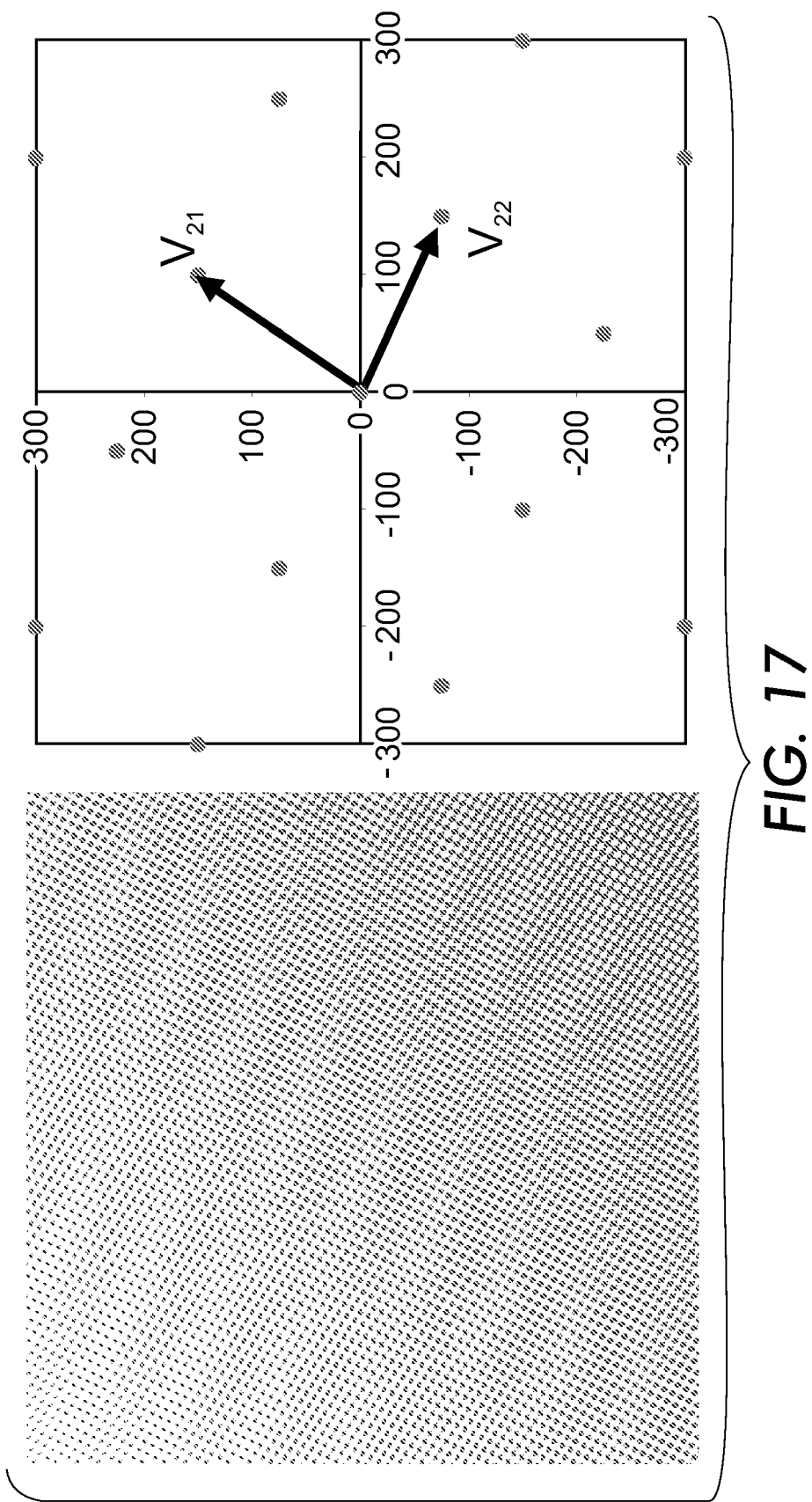
FIG. 17 depicts a halftone pattern created by the colorant 2 exemplary halftone screen of a color printing system, and along-side it the Fourier representation of that screen.
Figure 18:
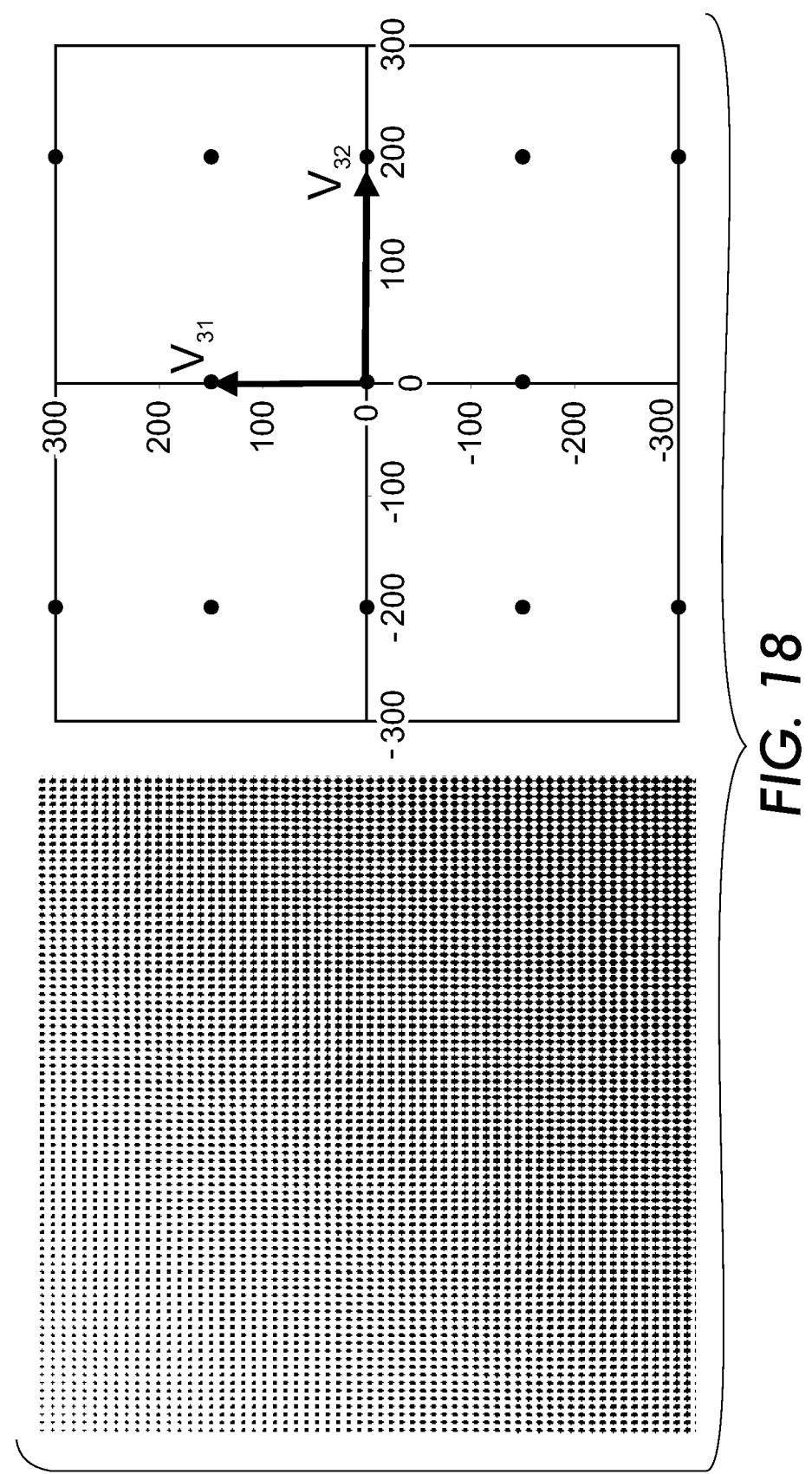
FIG. 18 depicts a halftone pattern created by the colorant 3 exemplary halftone screen of a color printing system, and along-side it the Fourier representation of that screen.
Figure 19:
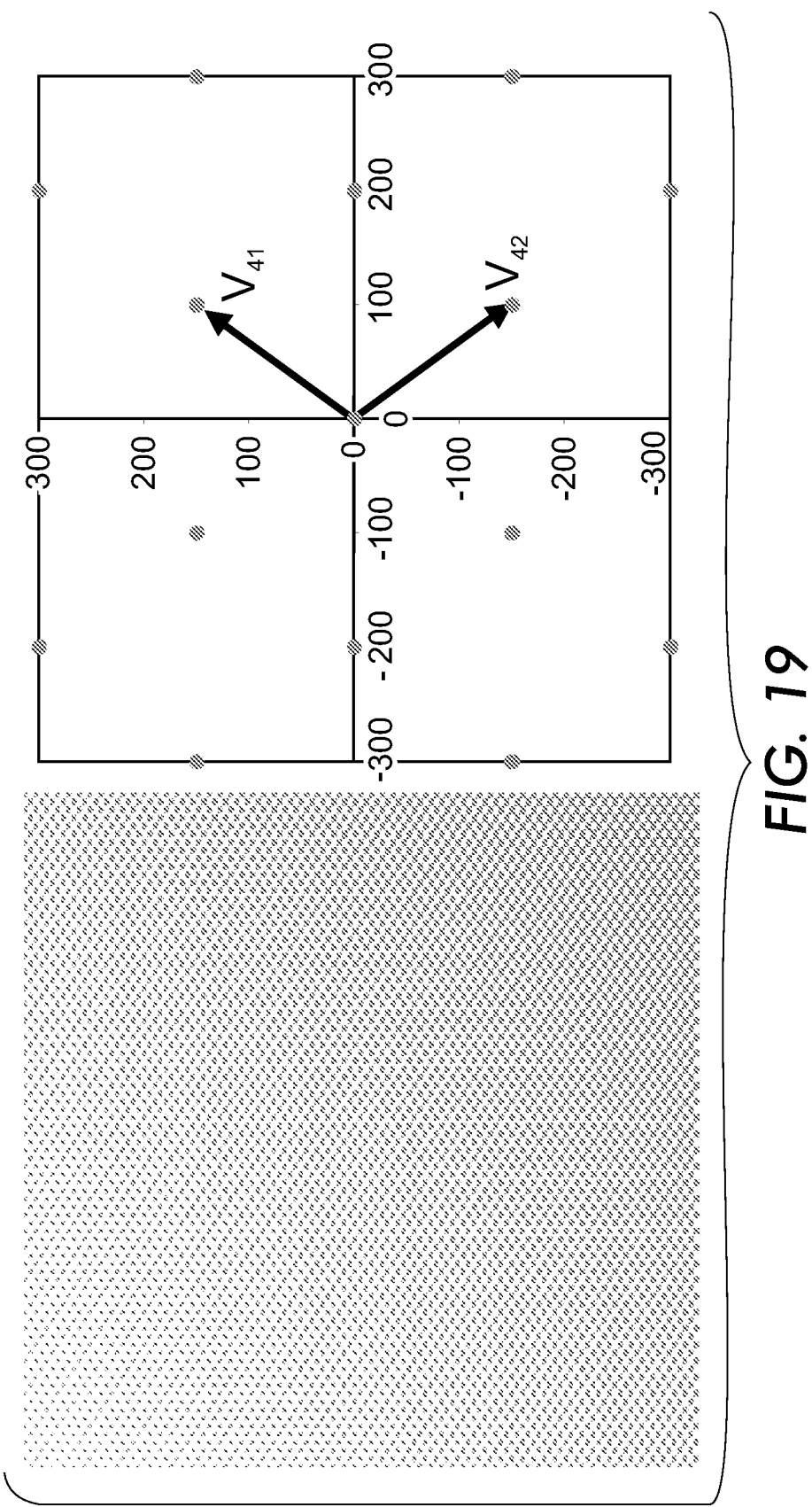
FIG. 19 depicts a halftone pattern created by the colorant 4 exemplary halftone screen of a color printing system, and along-side it the Fourier representation of that screen.
Figure 20:
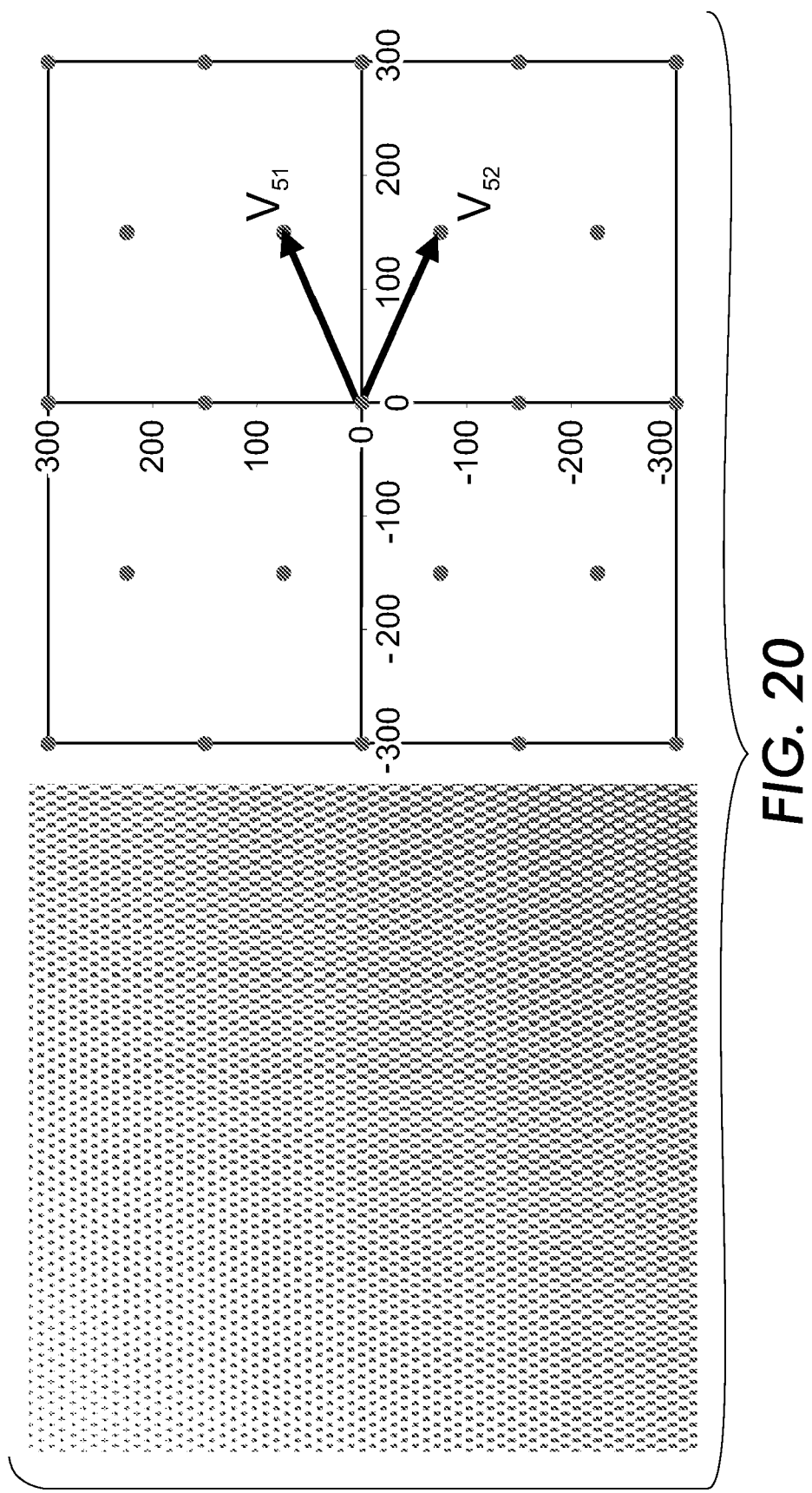
FIG. 20 depicts a halftone pattern created by the colorant 5 exemplary halftone screen of a color printing system, and along-side it the Fourier representation of that screen.
Figure 21:
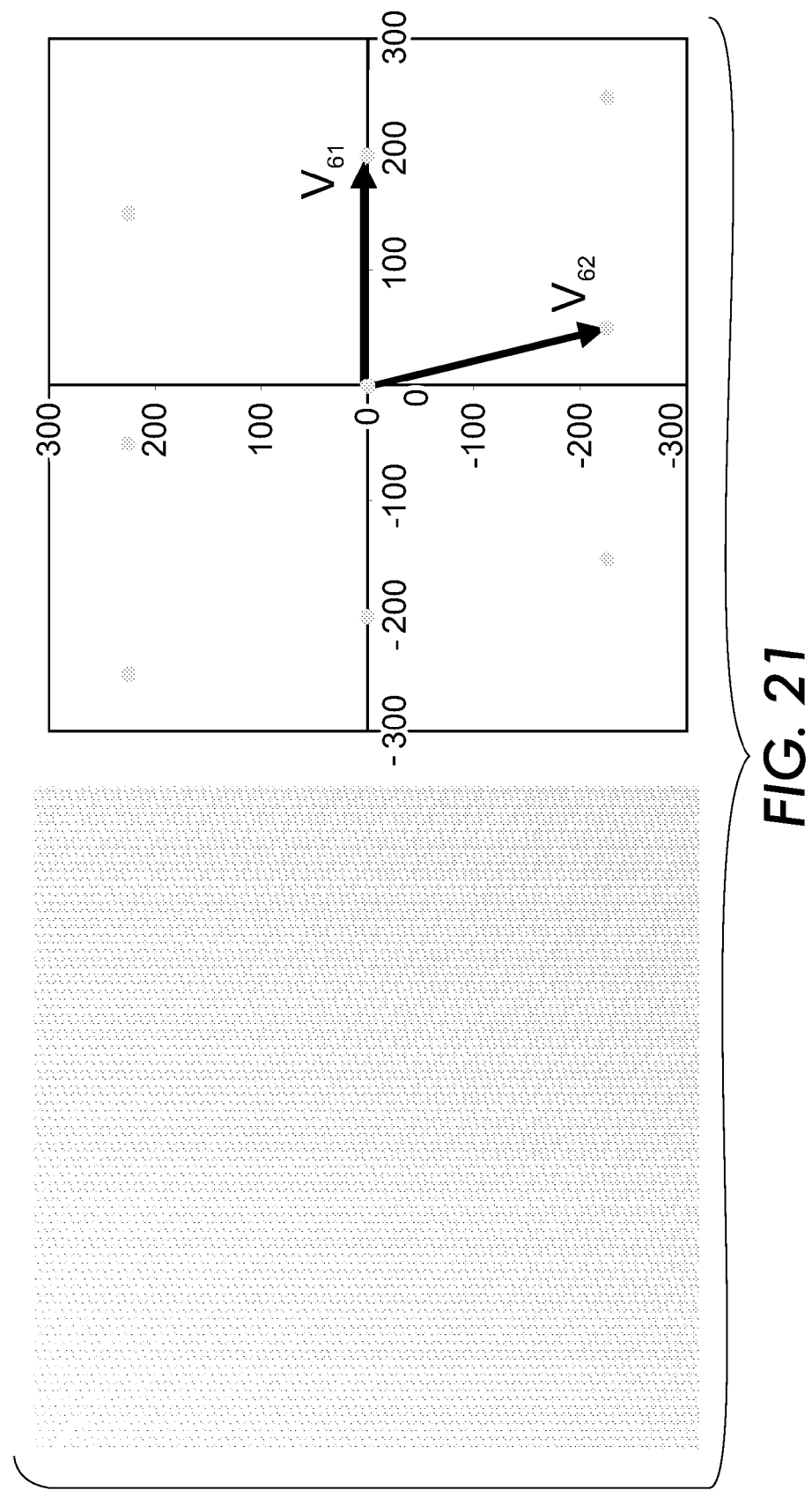
FIG. 21 depicts a halftone pattern created by the colorant 6 exemplary halftone screen of a color printing system, and along-side it the Fourier representation of that screen.
Figure 22:
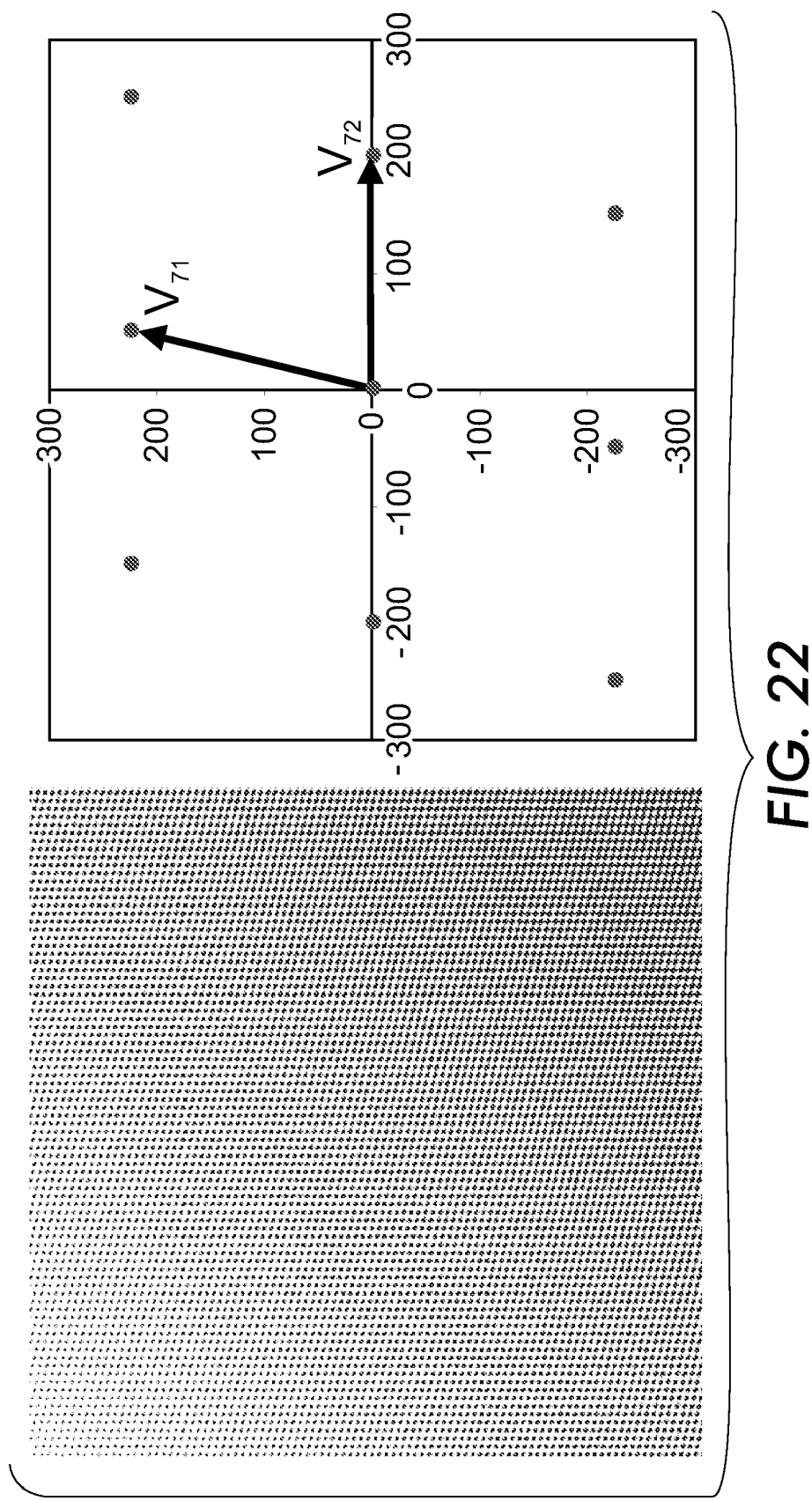
FIG. 22 depicts a halftone pattern created by the colorant 7 exemplary halftone screen of a color printing system, and along-side it the Fourier representation of that screen.
Figure 23:
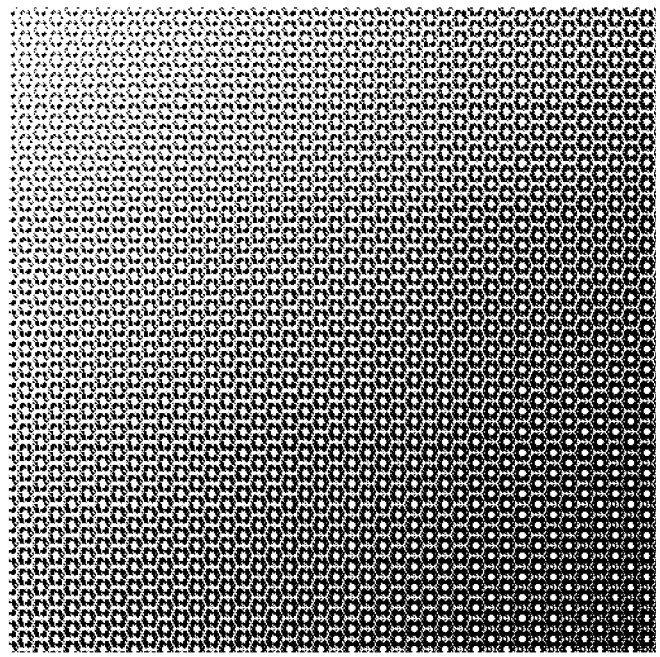
FIG. 23 depicts the superimposition of the colorant 1, colorant 2, and colorant 3 halftones as depicted in FIGS. 16-18, respectively.
Figure 24:
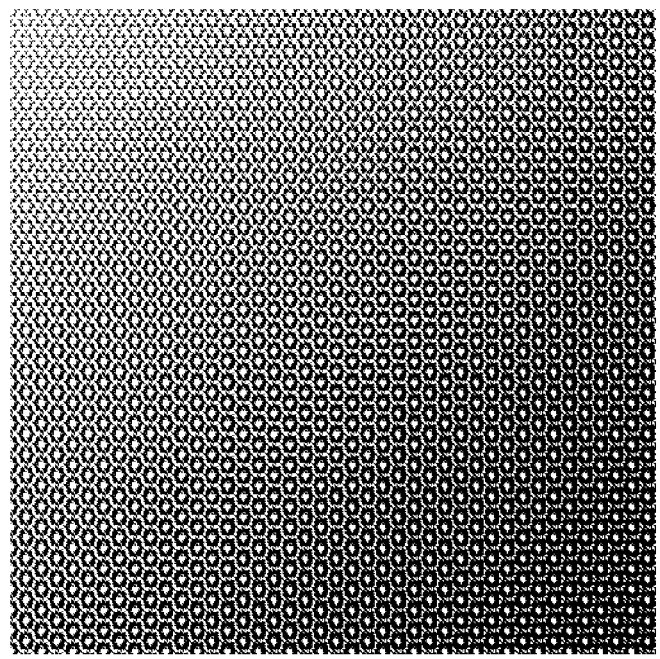
FIG. 24 depicts the superimposition of the colorant 3, colorant 4, and colorant 5 halftones as depicted in FIGS. 18-20, respectively.
Figure 25:
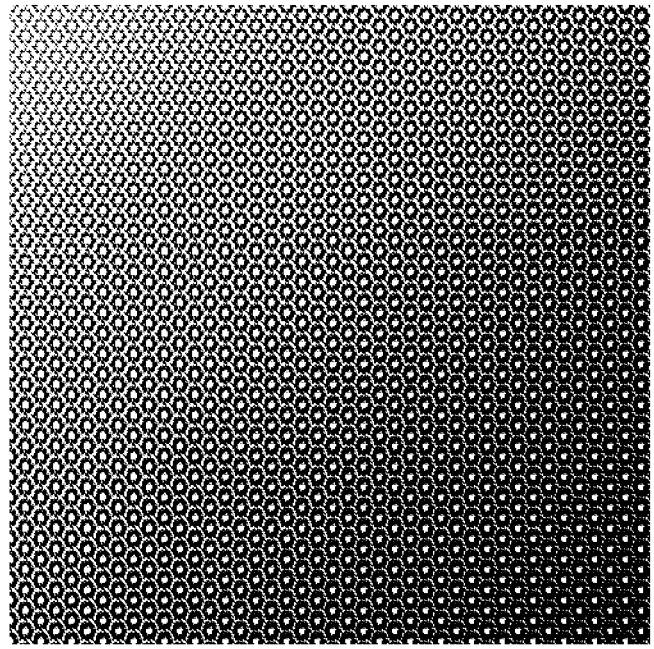
FIG. 25 depicts the superimposition of the colorant 1, colorant 2, colorant 3, colorant 4, and colorant 5 halftones as depicted in FIGS. 16-19 and 20, respectively.
Figure 26:
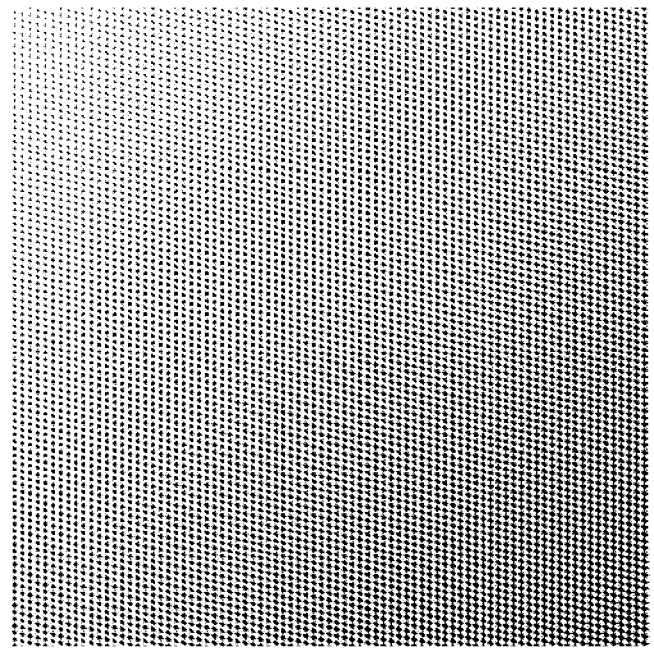
FIG. 26 depicts the superimposition of the colorant 6 and colorant 7 halftones as depicted in FIGS. 21-22, respectively.
Figure 27:
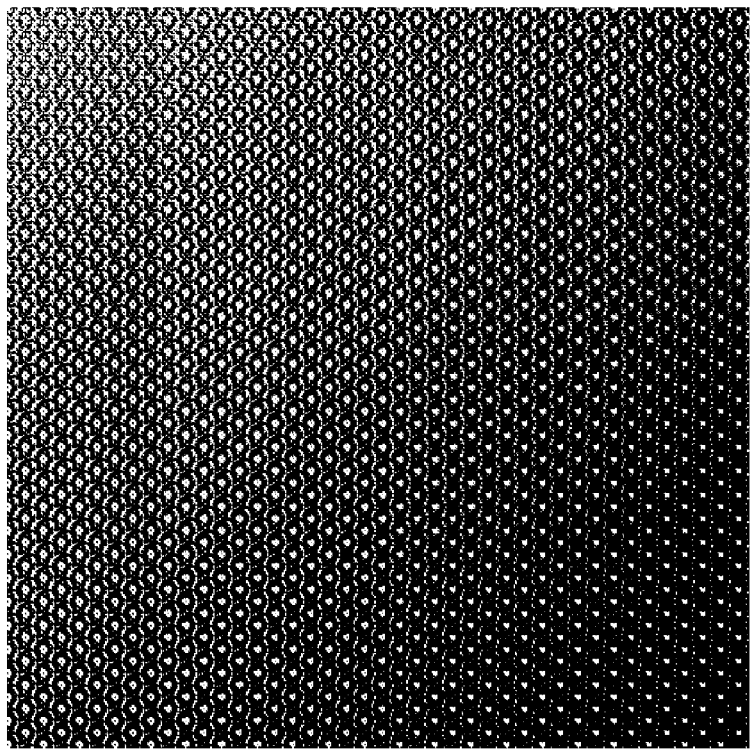
FIG. 27 depicts the superimposition of the colorant 1-7 halftones as depicted in FIGS. 16-22, respectively.

FIG. 15 shows the Fourier representation and frequency vectors of the rosettes for this seven-colorant halftone screen configuration. FIGS. 16 through 22 show the halftone outputs as provided by halftone screens 1 through 7, respectively, designed to satisfy the teachings herein. The Fourier representations accompany the halftone outputs in FIGS. 16 through 22. FIGS. 23 through 28 show various superimpositions of the seven halftone outputs. FIG. 23 depicts the superimposition of the colorant 1, colorant 2, and colorant 3 halftones as depicted in FIGS. 16, 17, and 18, respectively. FIG. 24 depicts the superimposition of the colorant 3, colorant 4, and colorant 5 halftones as depicted in FIGS. 18, 19, and 20, respectively. FIG. 25 depicts the superimposition of the colorant 1, colorant 2, colorant 3, colorant 4, and colorant 5 halftones as depicted in FIGS. 16, 17, 18, 19 and 20, respectively. FIG. 26 depicts the superimposition of the colorant 6 and colorant 7 halftones as depicted in FIGS. 21 and 22, respectively. FIG. 27 depicts the superimposition of the colorant 1-7 halftones as depicted in FIGS. 16-22, respectively. The figures illustrate that the superimpositions are free of moiré and possess pleasing hexagonal rosettes.

Another consideration is the relative shift, or phase positioning of the screens. The examples shown here align "holes" or white regions in a given halftone to white regions in the other separations. This alignment is known as "hole-centered" rosette. Note that other superimpositions could be aligned for different design goals. It is a well-known practice understood by those skilled in the halftone screen design arts to align multiple halftone screens for either dot-centered rosettes, hole-centered rosettes, or some structure that is a hybrid of those rosettes.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. An image forming method for digitally reproducing a moiré-free color halftone image using an enhanced halftone screen set consisting of a halftone screen for each of N colorants, N>4, the method comprising:
    using a color halftoning screening apparatus to perform:
        defining rosette fundamental frequency vectors ($V_{R1}$, $V_{R2}$) that satisfy a length and sum requirement to meet visual acceptability standards according to: $|V_{R1}|>f_{min}$, $|V_{R2}|>f_{min}$, and $|V_{R1}\pm V_{R2}|>f_{min}$;
        defining N halftone screens for colorants i=1, N, respectively possessing first and second frequency vectors ($V_{i1}$, $V_{i2}$), where no two screens possess identical fundamental frequency vector pairs;
        selecting fundamental frequency vectors for the N halftone screens according to: ($V_{i1}$, $V_{i2}$)=($m_{i1}V_{R1}$+$m_{i2}V_{R2}$, $n_{i1}V_{R1}$+$n_{i2}V_{R2}$) for integer m's and n's, where at least one fundamental frequency vector or its conjugate satisfies one of the following: $V_{ik}$=$V_{R1}$, $V_{ik}$=$V_{R2}$, and $|V_{ik}|>2\max[|V_{R1}|,|V_{R2}|]$; such that the set of N different halftone screens used in combination produces a moiré-free halftone output; and
    using said N halftone screens, as further specified by said selected fundamental frequency vectors, in an image forming apparatus for digital reproduction of a moiré-free color halftone image.

2. The method of claim 1 wherein the values of the integer m's and n's satisfy $|m|<8$ and $|n|<8$.

3. The method of claim 1 wherein the values of the integer m's and n's satisfy $2\leq|m_{i1}|+|m_{i2}|+|n_{i1}|+|n_{i2}|\leq 4$.

4. The method of claim 1 wherein $f_{min}$=100 cycles per inch.

5. The method of claim 1 wherein at least one screen possesses at least one fundamental frequency vector that is equal to a rosette fundamental frequency vector.

6. The method of claim 5 wherein the at least one screen that possesses at least one fundamental frequency vector that is equal to a rosette fundamental frequency vector is a halftone screen for the yellow colorant.

7. The method of claim 1 wherein four of the colorants are cyan, magenta, black, and yellow.

8. The method of claim 1 wherein at least one halftone screen of the screen set is formed of rectangular cells.

9. The method of claim 1 wherein a first halftone screen of the screen set shares a first fundamental frequency vector with a fundamental frequency vector of a second screen, and the second fundamental frequency vector of the first screen is not shared with the second fundamental frequency vector of the second screen.

10. The method of claim 1, wherein one of the colorants is one of orange, green, red, blue, violet, white, light magenta, light cyan and gray.

11. A method for generating a plurality of non-orthogonal halftone screen outputs for moiré-free enhanced color halftoning, the method comprising:
    using a color halftoning screening apparatus to perform:
        defining rosette fundamental frequency vectors ($V_{R1}$, $V_{R2}$) that satisfy a length and a sum requirement to meet visual acceptability standards according to: $|V_{R1}|>f_{min}$, $|V_{R2}|>f_{min}$, and $|V_{R1}\pm V_{R2}|>f_{min}$; and,
        specifying a first and a second color halftone screen fundamental frequency vector for each of N halftone screens, N>4 according to: ($V_{i1}$, $V_{i2}$)=($m_{i1}V_{R1}$+$m_{i2}V_{R2}$, $n_{i1}V_{R1}$+$n_{i2}V_{R2}$) for integer m's and n's, where at least one of the fundamental frequency vectors or its conjugate must also occur off of a second-order spectral hexagon which connects frequency components that lie just outside of a first-order spectral hexagon; and
    using said N halftone screens, as further specified by said first and second fundamental frequency vectors, in an image forming apparatus for digital reproduction of a moiré-free color halftone image.

12. The method of claim 11 wherein the values of the integer m's and n's satisfy $|m|<8$ and $|n|<8$.

13. The method of claim 11 wherein the values of the integer m's and n's satisfy $2\leq|m_{i1}|+|m_{i2}|+|n_{i1}|+|n_{i2}|\leq 4$.

14. The method of claim 11, wherein four screens, one each, are used to halftone cyan, magenta, black, and yellow image separations.

15. The method of claim 11 wherein $f_{min}=100$ cycles per inch.

16. A color halftoning screening apparatus for reproducing a moiré-free color halftone image using an enhanced halftone screen set consisting of a halftone screen for each of N colorants, N>4, the apparatus comprising:

rosette fundamental frequency vectors $V_{R1}$, $V_{R2}$ that satisfy a length and sum requirement to meet visual acceptability standards according to $|V_{R1}|>f_{min}$, $|V_{R2}|>f_{min}$, and $|V_{R1} \pm V_{R2}|>f_{min}$;

N halftone screens for colorants i=1, N, respectively possessing first and second frequency vectors ($V_{i1}$, $V_{i2}$), where no two screens possess identical fundamental frequency vector pairs; and fundamental frequency vectors for the N halftone screens according to ($V_{i1}$, $V_{i2}$)=($m_{i1}V_{R1}+m_{i2}V_{R2}$, $n_{i1}V_{R1}+n_{i2}V_{R2}$) for integer m's and n's, where at least one fundamental frequency vector or its conjugate also satisfies one of the following: $V_{ik}=V_{R1}$, $V_{ik}=V_{R2}$, and $|V_{ik}|>2\max[|V_{R1}|, |V_{R2}|]$.

17. The apparatus of claim 16 wherein the values of the integer m's and n's satisfy $|m|<8$ and $|n|<8$.

18. The apparatus of claim 17 wherein $f_{min}=100$ cycles per inch.

19. The apparatus of claim 16 wherein the values of the integer m's and n's satisfy $2 \leq |m_{i1}|+|m_{i2}|+|n_{i1}|+|n_{i2}| \leq 4$.

20. The apparatus of claim 16 wherein at least one screen possesses at least one fundamental frequency vector that is equal to a rosette fundamental frequency vector.

21. The apparatus of claim 20 wherein the at least one screen that possesses at least one fundamental frequency vector that is equal to a rosette fundamental frequency vector is a halftone screen for the yellow colorant.

22. The apparatus of claim 16 wherein four of the colorants are cyan, magenta, black, and yellow.

23. The apparatus of claim 16 wherein at least one halftone screen of the screen set is formed of rectangular cells.

24. The apparatus of claim 16 wherein a first halftone screen of the screen set shares a first fundamental frequency vector with a fundamental frequency vector of a second screen, and the second fundamental frequency vector of the first screen is not shared with the second fundamental frequency vector of the second screen.

25. The apparatus of claim 16, wherein one of the colorants is one of orange, green, red, blue, violet, white, light magenta, light cyan and gray.

* * * * *